United States Patent
Ramakrishnan et al.

(10) Patent No.: US 7,680,055 B1
(45) Date of Patent: Mar. 16, 2010

(54) METHOD AND APPARATUS FOR INCREASING SURVIVABILITY IN IP NETWORKS

(75) Inventors: Kadangode K. Ramakrishnan, Berkeley Heights, NJ (US); Mukul Goyal, Edison, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1701 days.

(21) Appl. No.: 10/805,643

(22) Filed: Mar. 19, 2004

Related U.S. Application Data

(60) Provisional application No. 60/506,816, filed on Sep. 26, 2003.

(51) Int. Cl.
*H04J 1/16* (2006.01)

(52) U.S. Cl. ...................... 370/238; 709/241

(58) Field of Classification Search ............... 370/230.1, 370/235–238, 256; 709/241
See application file for complete search history.

(56) References Cited

U.S. PATENT DOCUMENTS

| | | | |
|---|---|---|---|
| 5,805,599 A | 9/1998 | Mishra et al. | |
| 5,946,324 A | 8/1999 | Mishra et al. | |
| 5,974,028 A | 10/1999 | Ramakrishnan | |
| 7,130,262 B1 * | 10/2006 | Cortez et al. | 370/216 |
| 7,295,510 B2 * | 11/2007 | Johri | 370/216 |

OTHER PUBLICATIONS

J. J. Shi Analysis and design of survivable telecommunications networks Oct. 1997.*
Author: D. Awduche, A. Chiu, A. Elwalid, I. Widjaja, and X. Xioa; Title: "Overview and Principals of Internet Traffic Engineering," Request for Comments (Informational); *Internet Engineering Task Force*, RFC 3272; Date of Publication: May 2002; Place of Publication: United States.
Author: S. Ramamurthy and B. Mukherjee; Title: "Survivable WDM Mesh Networks, Part 1—Projection"; in *Proc. INFOCOM'1999*; Date of Publication: 1999; Place of Publication: United States.
Author: B. Fortz, J. Rexford, and M. Thorup; Title: "Traffic Engineering with Traditional IP Routing Protocols"; *IEEE Communications Magazine*, 118-124; Date of Publication: Oct. 2002; Place of Publication: United States.

(Continued)

*Primary Examiner*—Jason E Mattis
*Assistant Examiner*—Dady Chery
(74) *Attorney, Agent, or Firm*—Hoffmann & Baron, LLP

(57) ABSTRACT

A method and apparatus for increasing the capability of a network topology model having a plurality of nodes connected by existing links to maintain service continuity in the presence of faults. The steps of the method include adding new links to the network topology model to protect against single node failures, and adjusting link weights for the network topology model to reduce at least one of a cost of network operation and an imbalance in link utilizations. Preferably, the link weights are adjusted to reduce the imbalance in link utilizations without deteriorating the cost of network operation. The link weights are preferably adjusted to reduce the cost of network operation without increasing the imbalance in link utilizations. Preferably, the link weights are adjusted to reduce the cost of network operation without increasing the imbalance in link utilizations while keeping the utilization for each link below a specific threshold. In addition, links can be added to the network topology model to reduce the cost of network operation.

30 Claims, 12 Drawing Sheets

OTHER PUBLICATIONS

Author: Y. Wang, Z. Wang, and L. Zhang; Title: "Internet Traffic Engineering Without Full Mesh Overlaying"; *Proc. INFOCOM'2001*; Date of Publication: 2001; Place of Publication: United States.

Author: C. Labovitz, A. Ahuja, and F. Jahanian; Title: "Experimental Study of Internet Stability and Wide-Area Backbone Failures"; *Proc. FTCS'1999*; Date of Publication: 1999; Place of Publication: United States.

Author: A. Feldmann, A. Greenberg, C. Lund, N. Reingold, J. Rexfod, and F. True; Title: "Deriving Traffic Demands for Operational IP Networks; Methodology and Experience"; *IEEE/ACM Transactions on Networking*, 9(3):265-279; Date of Publication: Jun. 2001; Place of Publication: United States.

Author: G. Li, D. Wang, C. Kalmanek, and R. Doverspike; Title: "Efficient Distributed Path Selection for Shared Restoration Connections"; *Proc. INFOCOM'2002*; Date of Publication: 2002; Place of Publication: United States.

Author: D. Katz, D. Yeung, and K. Kompella; Title: "Traffic Engineering Extensions to OSPF Version 2"; *Internet-Draft*, draft-katz-yeung-ospf-traffic-09.txt; Date of Publication: Sep. 2003 (work in progress).

Author: C. Alaettinoglu, V. Jacobson, and H. Yu; Title: "Towards Millisecond IGP Convergence"; in *NANOG 20*; Date of Publication: Oct. 2000; Place of Publication: United States.

Author: A. Maunder and G. Choudhury; Title: "Explicit Marking and Prioritized Treatment of Specific IGP Packets for Faster IGP Convergence and Improved Network Scalability and Stability"; *Internet-Draft*, draft-ietf-ospf-scalability-00.txt; Date of Publication: Mar. 2001, (work in progress).

Author: M. Goyal, K.K. Ramakrishnan, and W. Feng; Title: "Achieving Faster Failure Detection in OSPF Networks"; in *Proc. ICC'2003*; Date of Publication: May 2003; Place of Publication: United States.

Author: M. Goyal; Title: "Internet Traffic Engineering: QoS Translation and Survivability"; Dissertation; Date of Publication: 2003; Place of Publication: The Ohio State University, United States.

Author: J. Anderson, B. Doshi, S. Dravida, and P. Harshavardhana; Title: "Fast Restoration of ATM Networks"; *IEEE Journal on Selected Areas of Communications*, 12(1):128-138; Date of Publication: Jan. 1994; Place of Publication: United States.

Author: R. Kawamura, K. Sato, and I. Tokizawa; Title: "Self-healing ATM Networks Based on Virtual Path Concept"; *IEEE Journal on Selected Areas in Communication*, 12(1):120-127; Date of Publication: Jan. 1994; Place of Publication: United States.

Author: K. Murakami and H. Kim; Title: "Optimal Capacity and Flow Assignment for Self-Healing ATM Networks Based on Line and End-To-End Restoration"; *IEEE/ACM Transactions on Networking*, 6(2):207- 221; Date of Publication: Apr. 1998; Place of Publication: United States.

Author: R. Iraschko, M. MacGregor, and W. Grover; Title: "Optimal Capacity Placement for Path Restoration in STM or ATM Mesh Survivable Networks"; *IEEE/ACM Transactions on Networking*, 6(3):325-336; Date of Publication: Jun. 1998; Place of Publication: United States.

Author: Y. Xiang and L. Mason; Title: "Restoration Strategies and Spare Capacity Requirements in Self-Healing ATM Networks"; *IEEE/ACM Transactions on Networking*, 7(1):98-110; Date of Publication: Feb. 1999; Place of Publication: United States.

Author: B.V. Caenegem, W.V. Parys, F.D. Turck, and P.M. Demeester; Title: "Dimensioning of Survivable WDM Networks"; *IEEE Journal on Selected Areas in Communication*, 16(7):1146-1157; Date of Publication: Sep. 1998; Place of Publication: United States.

Author: B. Fortz and M. Thorup; Title: "Internet Traffic Engineering by Optimizing OSPF Weights"; *Proc. INFOCOM'2000*, Date of Publication: 2000; Place of Publication: United States.

Author: B. Fortz and M. Thorup; Title: "Optimizing OSPF/IS-IS weights in a Changing World"; *IEEE Journal on Selected Areas in Communications*, 20(4):756-767; Date of Publication: May 2002; Place of Publication: United States.

Author: Mapnet; Title: "Macroscopic internet visualization and measurement tool"; http://www.caida.cor/tools/visualization/mapnet; Place of Publication: United States.

Author: M. Goyal and K.K. Ramakrishnan; Title: "On survivability in ip networks"; Technical report http://www.cis.ohio-state.edu/mukul/survcost-report.ps; Date of Publication: Jun. 2003; Place of Publication: United States.

* cited by examiner

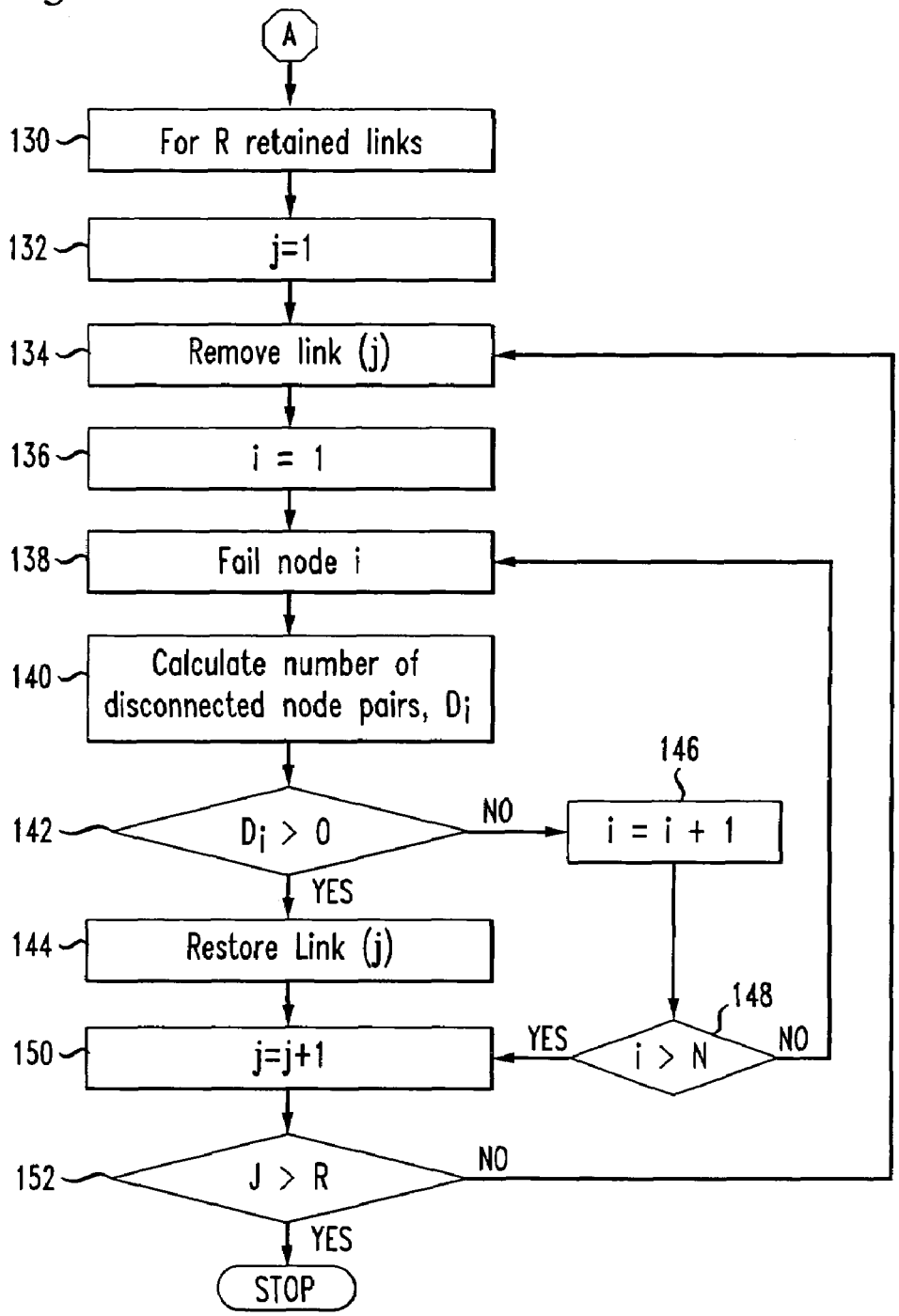

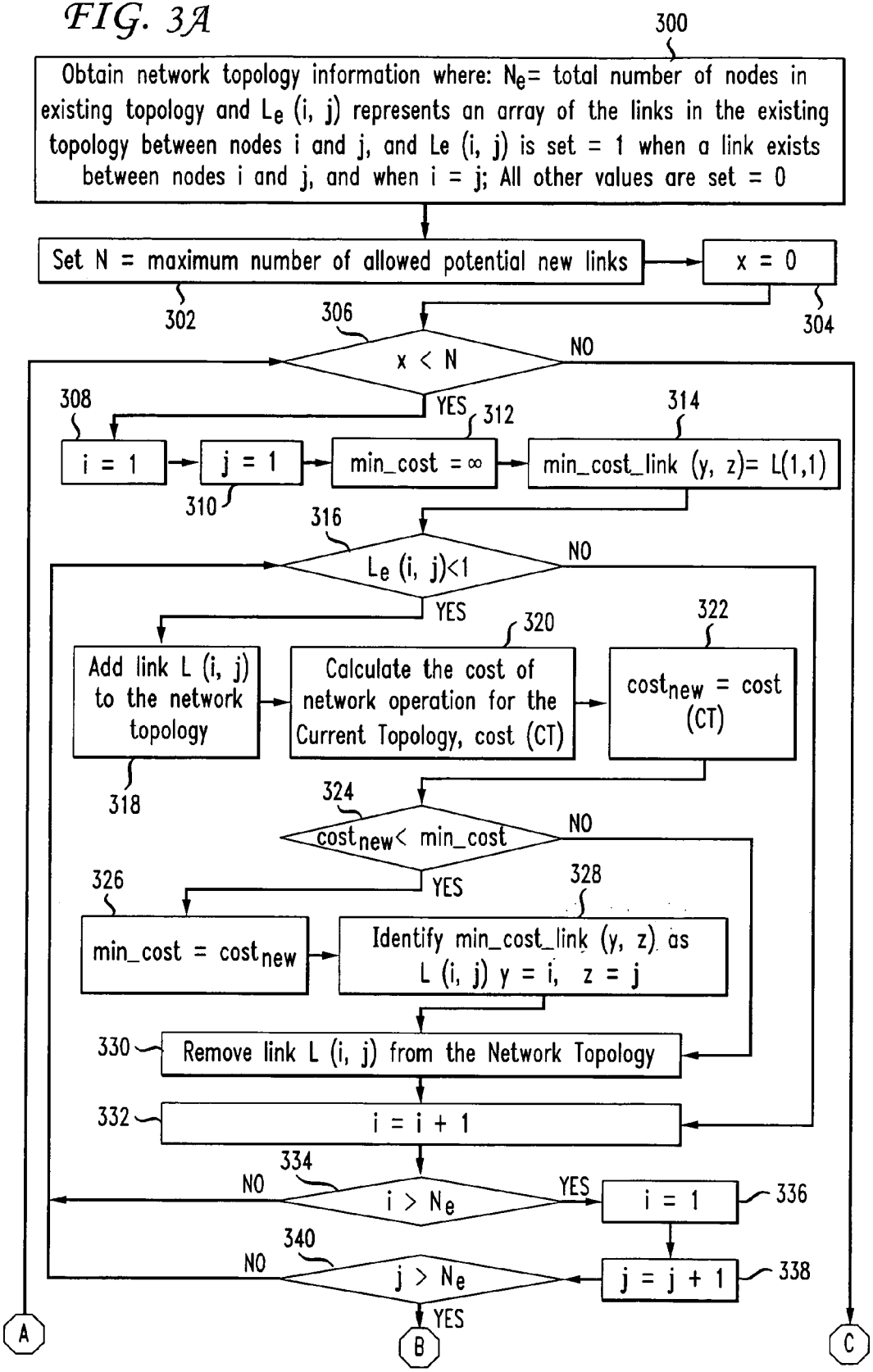

METHOD AND APPARATUS FOR INCREASING SURVIVABILITY IN IP NETWORKS

This application claims priority to U.S. Provisional Application No. 60/506,816, filed on Sep. 26, 2003, which is incorporated herein by reference.

FIELD OF THE INVENTION

The present invention relates generally to communication systems and, more particularly, to methods for analyzing and reducing the cost of survivability in IP networks while considering link weights, link utilization, and adding links to the network topology.

BACKGROUND OF THE INVENTION

Survivability has been defined as "the capability of a network to maintain service continuity in the presence of faults." D. Awduche, A. Chiu, A. Elwalid, 1. Widjaja, and X. Xiao, "Overview and Principals of Internet Traffic Engineering," Re-quest for Comments (Informational) RFC 3272, Internet Engineering Task Force, May 2002. Since the Internet has become a key for communications and commerce in the world today, network survivability has assumed great importance. Networks need to be designed so that connectivity is maintained in the face of failures in the network. Links have to be provisioned so that there is sufficient capacity to carry the additional network traffic coming their way in the event of failures. Protecting the service quality (minimally assuring availability of capacity) in the face of network failures requires redundant resources (over what is required for failure free operation) which increases the cost of network operation.

Accordingly, there is a need for methods to evaluate the extra cost of survivability and to reduce the cost of network operation with survivability.

SUMMARY OF THE INVENTION

The present invention is a method and apparatus for increasing the capability of a network topology model having a plurality of nodes connected by existing links to maintain service continuity in the presence of faults. The steps of the method of the invention include adding new links to the network topology model to protect against single node failures, and adjusting link weights for the network topology model to reduce at least one of cost of network operation, and an imbalance in link utilizations. The link weights are preferably adjusted to reduce the imbalance in link utilizations without deteriorating the cost of network operation. The link weights can also be adjusted to reduce the cost of network operation without increasing the imbalance in link utilizations. The link weights are preferably adjusted to reduce the cost of network operation without increasing the imbalance in link utilizations while keeping the utilization for each link below a specific threshold. In addition, links can be added to the network topology model to reduce the cost of network operation.

The present invention similarly includes an article of manufacture for increasing the capability of a network topology model having a plurality of nodes connected by existing links to maintain service continuity in the presence of faults. The article includes a machine readable medium containing one or more programs which when executed implement the method of the invention.

The present invention assists network administrators in evaluating the "cost of survivability" for network topologies belonging to both commercial and educational Internet Service Providers (ISPs). The "cost of survivability" is defined as the ratio of the costs of network operation with and without survivability requirements. The evaluation is performed for traditional Open Shortest Path First (OSPF) recovery as well as Multiprotocol Label Switching (MPLS) explicit routing based local recovery and end-to-end (E2E) recovery. The traditional OSPF recovery is based on calculating new shortest paths from a node to all the destinations in the changed topology. The MPLS explicit routing local recovery is based on local re-tunneling of the affected traffic around the failed node. The MPLS E2E recovery is based on switching the affected traffic to a different end-to-end backup path, which is node disjoint with the original path.

Similar to the findings of several other studies, the application of the present invention has determined that the cost of survivability associated with MPLS local recovery can be significantly higher than that of MPLS E2E recovery. J. Anderson, B. Doshi, S. Dravida, and P. Harshavardhana, "Fast Restoration of ATM Networkss," *IEEE Journal on Selected Areas in Communications*, vol. 12, no. 1, pp. 128-138, January 1994; R. Kawamura, K. Sato, and I. Tokizawa, "Self-healing ATM Networks Based on Virtual Path Concept," *IEEE Journal on Selected Arreas in Communication*, vol. 12, no. 1, pp. 120-127, January 1994; K. Murakami and H. Kim, "Optimal Capacity and Flow Assignment for Self-Healing ATM Networks Based on Line and End-To-End Restoration," *IEEE/ACM Transactions on Networking*, vol. 6, no. 2, pp. 207-221, April 1998; R. Iraschko, M. MacGregor, and W. Grover, "Optimal Capacity Placement for Path Restoration in STM or ATM Mesh Survivable Networks," *IEEE/ACM Transactions on Networking*, vol. 6, no. 3, pp. 325-336, June 1998; Y Xiong and L. Mason, "Restoration Strategies and Spare Capacity Requirements in Self-Healing ATM Networks," *IEEE/ACM Transactions on Networking*, vol. 7, no. 1, pp. 98-110, February 1999; S. Ramamurthy and B. Mukherjee, "Survivable WDM Mesh Networks, Part 1—Protection," in *Proc. INFOCOM'1999*, 1999; B. V Caenegem, W. V. Parys, F. D. Turck, and P. M. Demeester, "Dimensioning of Survivable WDM Networks," *IEEE Journal on Selected Arreas in Communication*, vol. 16, no. 7, pp. 1146-1157, September 1998. In addition, the present invention has determined that those MPLS E2E recovery schemes that are based on shortest path routing do not necessarily result in a lower cost of survivability than OSPF recovery. The present invention has also revealed that the cost of survivability is essentially determined by the topological characteristics and is not significantly influenced by the variations in the traffic matrix.

The present invention assesses ways to reduce the cost of network operation for survivability. Since the cost is determined by the required link capacities, which in turn are determined by the traffic routes, the cost of network operation for survivability can be significantly reduced by adjusting the traffic routes in an intelligent manner. Traditional OSPF routing, as well as shortest path-based explicit routing schemes, depend directly or indirectly on static link weights to make routing decisions. Adjusting link weights provides a natural handle to reduce the cost of network operation. Often, owing to sparse connectivity in the network, there are only a few choices for possible routes, and in such scenarios weight adjustments may not offer significant savings.

Since network topologies and link loads typically have certain node pairs that act as transit points for large fractions of total network traffic and are connected via multiple long distance hops, addition of new links in the topology to enable such node pairs to be directly connected can reduce the capacity requirements at other links significantly. The present invention examines the effectiveness of link additions, weight adjustments, and the combination of link additions and weight adjustments in terms of reducing the cost of network operation for survivability. The present invention also examines the benefits of link weight adjustments and link additions even if there is a significant change in the network traffic matrix.

Finally, the present invention also examines the relationship between the cost of network operation for survivability and load balancing. Traffic engineering has traditionally been associated with load balancing i.e., adjusting the routes so that traffic loads move from highly utilized links to links with lower utilization. Link weight adjustments have been identified as a practical and effective means of achieving better balance in link utilizations. B. Fortz and M. Thorup, "Internet Traffic Engineering by Optimizing OSPF Weights," *Proc. INFOCOM'2000*, 2000; B. Fortz, J. Rexford, and M. Thorup, "Traffic Engineering with Traditional IP Routing Protocols," *IEEE Communications Magazine*, pp. 118-124, October 2002; B. Fortz and M. Thorup, "Optimizing OSPFLISIS weights in a Changing World," *IEEE Journal on Selected Areas in Communications*, vol. 20, no. 4, pp. 756-767, May 2002; Y Wang, Z. Wang, and L. Zhang, "Internet Traffic Engineering Without Full Mesh Overlaying," *Proc. INFOCOM'2001*, 2001.

However, the present invention has also determined that the route changes performed during load balancing operations can significantly increase the cost of network operation for survivability. Moreover, a previously failure-resistant network might become susceptible to failures as a result of route changes done to achieve a better balance among link loads. Similarly, the route changes designed to reduce the cost of network operation for survivability can significantly deteriorate the load balance. Preferred embodiments of the present invention account for the non-complementary nature of load balancing and the cost reducing route adjustments.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein:

FIGS. 1A and 1B are a flowchart illustrating a process of adding new links to a network topology model having a plurality of nodes connected by existing links to achieve protection against single node failures for Open Shortest Path First (OSPF) and Multiprotocol Label Switching (MPLS) based local recovery;

FIGS. 3A and 3B are a flowchart illustrating a process of adding links to a network topology model having a plurality of nodes connected by existing links to reduce the cost of network operation;

DETAILED DESCRIPTION OF THE INVENTION

I. Introduction

Figure 1A:
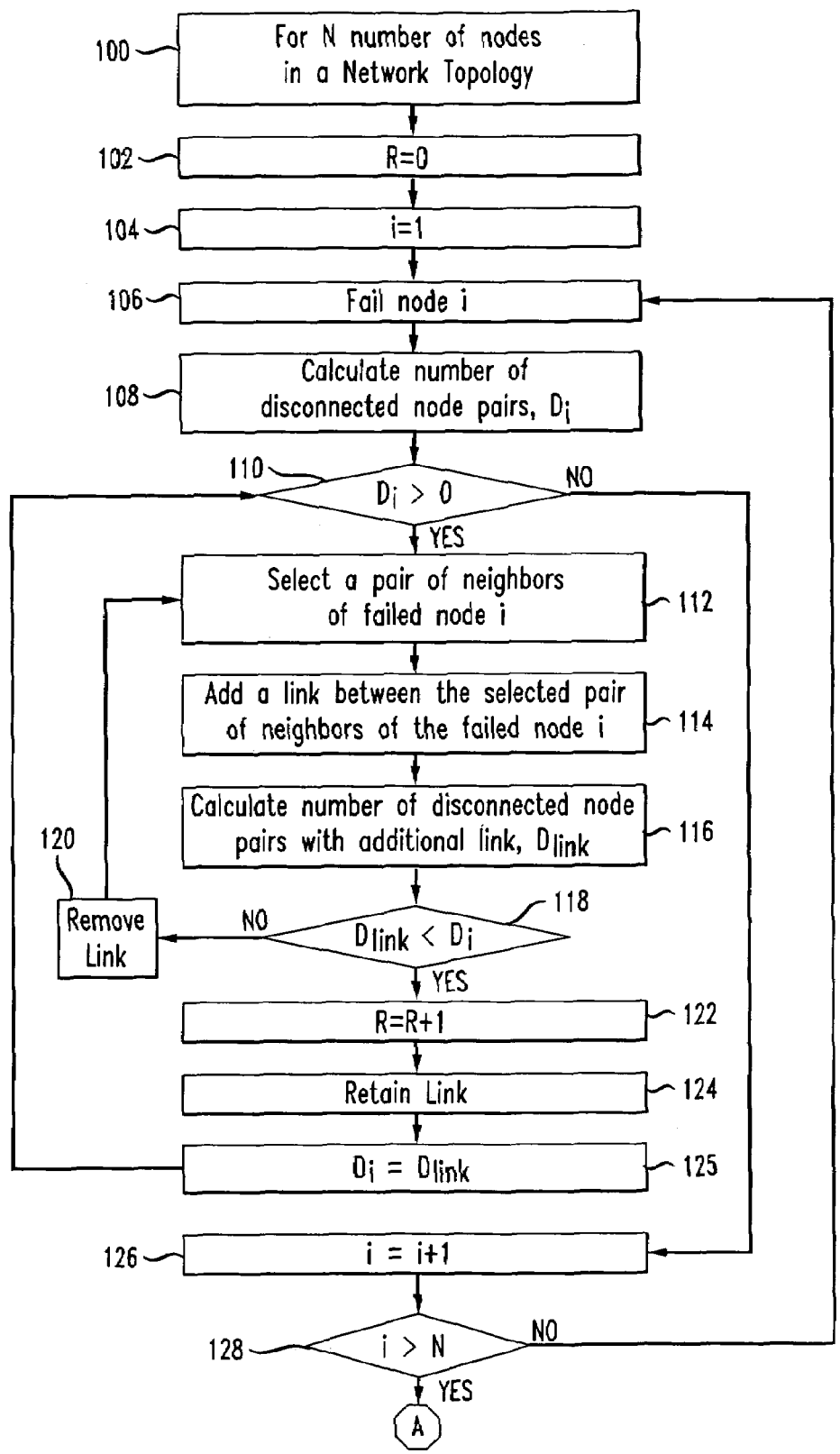

The present invention is a tool for network administrators to analyze and assess the capability of existing and proposed network topologies to maintain service continuity in the presence of faults. In order to use the invention, the network administrator will initially obtain relevant parameters regarding the existing or proposed network topology to generate a model of the topology for analysis. That is, once the parameters of the network topology are obtained for analysis, the invention works off-line on a model of the network topology. The network topology parameters can generally be obtained from a network topology server or database, or could be entered manually as well.

The steps of the method of the invention include adding new links to the network topology model to protect against single node failures, and adjusting link weights for the network topology model to reduce at least one of a cost of network operation and an imbalance in link utilizations. In a preferred embodiment of the invention, the link weights are adjusted to reduce the imbalance in link utilizations without deteriorating the cost of network operation. In another preferred embodiment of the invention, the link weights are adjusted to reduce the cost of network operation without increasing the imbalance in link utilizations. In another preferred embodiment of the invention, the link weights are adjusted to reduce the cost of network operation without increasing the imbalance in link utilizations while keeping the utilization for each link below a specific threshold. In addition, links can be added to the network topology model to reduce the cost of network operation. Each of the embodiments of the invention are discussed in detail below.

II. Connectivity and Cost of Survivability

Link and node failures constitute the two main types of network failures that are typically observed in a service provider network. C. Labovitz, A. Ahuja, and F. Jahanian, "Experimental Study of Internet Stability and Wide-Area Backbone Failures," *Proc. FTCS'1999*, 1999. The link failures can be caused by either the interface failures in a router or cable/fiber cuts. The node failures can be associated with either the failure of a single router or a complete point-of-presence (PoP), that is, a group of access and core routers located in the same facility. Protection from a single router failure also provides protection against single link failures. In this section, the "cost of survivability" associated with different protection mechanisms for protection against single node failures is defined along with a method for adding links to the network topology to protect against single node failures.

The survivability analysis in accordance with the present invention was developed based on the examination of 28 real network topologies used as the IP backbones by commercial and educational Internet Service Providers (ISPs). The inventors observed that most of the topologies were not connected well enough to provide both primary and node-disjoint backup paths for all the flows (i.e. traffic flowing between a given source-destination pair) for MPLS end-to-end (E2E) recovery. Poor connectivity also led to network partitions in case of several single node failures. In order to make the topologies single node failure proof, the inter-connectivity among the nodes in the topology required enhancement. For MPLS E2E recovery, this can be achieved by adding randomly selected new links to the network topologies. For OSPF recovery/MPLS local recovery, new links can be added between neighbors of the node whose failure will cause a network partition. The methodology for adding links to ensure survivability against single node failures is explained in detail below.

Referring to FIGS. 1A and 1B, a flowchart illustrating the process of adding new links to a network topology model to achieve protection against single node failures for OSPF and MPLS based local recovery in accordance with the present invention is depicted. The process initially adds new links to the network topology as depicted by the steps shown between flowchart identifiers 100 and 128. The process then removes the new added links that are not required to achieve single node failure protection to the network topology as depicted by the steps shown between flowchart identifiers 130 and 152.

Referring to the portion of FIG. 1A between flowchart identifiers 100 and 128, the initial steps 100, 102, 104 initialize parameters N, R, and i for processing where: N represents the total number of the plurality of nodes in the network topology; R is a counter that represents the number of initially retained new links; and i corresponds to a node number assigned to each of the N number of nodes. The next step 106 is to fail one of the plurality of nodes in the network topology. A first number of disconnected node pairs, $D_i$, is calculated at step 108 for failed node i. If there are no disconnected node pairs ($D_i$=0), then the node number is incremented at step 126 to process the next node. Otherwise, a pair of nodes which neighbor the failed node are selected, and a new link is added between the pair of nodes.

A second number of disconnected node pairs, $D_{link}$, is calculated at step 116 while the topology has the additional link. If the second number of disconnected node pairs, $D_{link}$, is less than the first number, $D_i$, the new link is retained at step 124, and the processing parameters R and i are incremented at steps 122, 126 and the first number of disconnected node pairs, $D_i$, is set equal to the second number of disconnected node pairs, $D_{link}$, at step 125. As an alternative to setting the first number of disconnected node pairs, $D_i$, equal to the second number of disconnected node pairs, $D_{link}$, 125, the processing could be returned to recalculate the first number of disconnected node pairs, $D_i$, at step 108. If the second number of disconnected node pairs, $D_{link}$, is not less than the first number, $D_i$, the new link is removed at step 120 and the processing returns to randomly select a new pair of nodes which neighbor the failed node at step 112. The process of randomly selecting combination of pair of nodes is repeated until the first number of disconnected node pairs, $D_i$, equals zero at step 110. Once the first number of disconnected node pairs, $D_i$, equals zero for a failed node i, the node number i is incremented at step 126 to repeat the addition of links for each node until all of the nodes have been processed 128.

Referring to the portion of FIG. 1B between flowchart identifiers 130 and 152, step 132 initializes parameter j for processing where j corresponds to a retained link number assigned to each of the R number of retained links. The next step is to remove one of the plurality of retained links, link (j), in the modified network topology at step 134. The removed link, link (j), will be restored 144 when the removal causes any node pair to become disconnected for any single node failure. The disconnection node condition is analyzed by failing node i at step 138 and calculating the number of disconnected node pairs, $D_i$, at step 140. If the number of disconnected node pairs is greater than zero for any node i, the link (j) is restored 144 and the next link (j+1) is processed at step 150. Otherwise, the process is repeated for each node via the loop defined by steps 146, 148. The processing is repeated for each of the plurality of retained new links in the modified network topology until j is greater than R in step 152.

After modifying a network topology to ensure survivability against single node failures, the cost of survivability in terms of the extra capacity requirements needs to be considered. The cost of network operation is influenced by a number of parameters including the initial investment required in establishing nodes/links (capital expenditure) and the continuing expenditures involved in maintaining the network (operational expenditures). Since most of the capital expenditure has already been incurred in existing IP backbone networks, the present invention focuses on reducing the operational expenditure of the networks in considering the survivability requirements. In the absence of a generally applicable and sophisticated operational expenditures model, the present invention employs a simple model for operational expenditures incurred in a network.

In the model, the continuing cost of network operation primarily consists of the cost of operating the links, i.e., the cost of leasing capacity for the backbone links over underlying fiber networks. While calculating the cost of network operation, it is important to consider both the capacity required on a link to accommodate all the traffic coming its way for all possible failure scenarios, as well as the characteristics of the link such as the distance spanned by the link. For example, a trans-continental link between Los Angeles and New York City is potentially more expensive than a much shorter link of the same capacity between Washington D.C. and New York City. A number of such considerations may determine the actual cost of the capacity required on a link. In the model, the distance spanned by the link is a scaling factor for the cost of the link:

$$\text{link cost} = \text{required link capacity} \times \text{link distance} \quad (1)$$

While the actual distance traversed by a link depends on the underlying fiber network, a rough estimate can be obtained by calculating the geographical distance between the end nodes using their latitude and longitude values. The required capacity on a link in a given scenario can be estimated as the sum of the average traffic load of all the "flows" (i.e., traffic belonging to a particular source-destination pair) passing through the link. It has been determined with packet level simulations that, when the number of flows passing through a link is large enough (about 20 or more) statistical multiplexing ensures that a link capacity equal to the sum of average traffic loads of all the flows is sufficient to accommodate the variations in the traffic load of individual flows even for very bursty traffic load distributions. Therefore, the required capacity on a link for protection against all single node failures is the maximum of the capacities required on the link for different failure scenarios, as well as for failure free operation.

The overall cost of network operation for a network topology is calculated as follows:

$$\text{cost (network topology)} = \sum_{\forall i} \text{required link capacity}_i \times \text{distance}_i \quad (2)$$

where i is a link in the network. The cost of survivability is calculated as the ratio of the cost of network operation, defined above, with and without the protection against failures as follows:

$$\text{surv\_cost} = \frac{\text{cost}_{protection}}{\text{cost}_{no\_protection}} \quad (3)$$

The term surv_cost refers to the cost of survivability, defined above, for protection against single node failures and the term $\text{cost}_{protection}$ refers to the cost of network operation (as defined in Equation 2) for protection against single node failures.

III. Reducing the Cost of Network Operation for Survivability

The cost of network operation for survivability ($\text{cost}_{protection}$), defined in Equation 2, can be reduced by controlling the traffic routes so that less traffic flows over high cost links. This can be achieved either via link weight adjustments or by adding new links to the topology. Link weight adjustments can be used to make low cost (i.e. short distance) links more attractive to the traffic than high cost (i.e. long distance) links. However, because the network topology may be sparsely connected, often long and circuitous routes are the only possible choices. In such scenarios, link weight adjustments may not be useful. Careful introduction of a few new links to the topology providing direct connections between key transit points can significantly reduce the overall cost of network operation.

Changes to the traffic routes can possibly alter the survivability characteristics of the topology. That is, a previously failure-proof topology might become susceptible to failures after modification. The weight adjustment and link addition processes preferably include precautions against such occurrences. In particular, the survivability characteristics of a network topology can be defined as a metric, SC(network topology), which is considered to have deteriorated after a link weight change when a failure in the network causes a node pair to become disconnected after the weight change while that node pair was not disconnected for the same failure event before the weight change. The SC(network topology) metric can be defined as a 3-dimensional (n×n×n) boolean array where n equals the number of nodes in the network topology. A particular element of this array (i, j, k) has value 0 (false) if the failure of node 'i' leaves nodes 'j' and 'k' disconnected. Otherwise the element (i,j,k) has value 1 (true). The '<' relation between survivability characteristics of two network topologies A and B can defined as follows: SC(A) <SC(B) if $(i, j, k)_A=0$ and $(i, j, k)_B=1$ for some value of 'i', 'j' and 'k'. Here $(i, j, k)_A$ is an element of SC(A) whereas $(i, j, k)_B$ is the corresponding element of SC(B). In particular, there is a possibility that the survivability characteristics of a network topology may deteriorate after a link weight change for MPLS E2E recovery-based topologies. Accordingly, the weight adjustment for MPLS E2E recovery-based topologies is preferably only made permanent when the survivability characteristics of a network topology have not deteriorated.

The adjustment of link weights in order to reduce the cost of network operation is preferably performed using a heuristic based local search. The heuristic used in the search is to increment the weight of the costliest link so as to make it less attractive for use in either primary or backup paths. In this regard, the cost of a link is calculated using Equation 1. In each iteration of the local search, the link with the maximum cost is identified and its weight is increased. The weight increment is preferably a unit amount. The weight adjustment is made permanent if it results in lowering the $\text{cost}_{protection}$ value. Otherwise, the link weight adjustment is undone and the link is "marked" so that no further attempts are made to modify its weight in a future iteration. The search process ends when all the links in the topology have been marked.

It is possible that increasing the weight of a marked link in a future iteration may further reduce the $\text{cost}_{protection}$ value. However, avoiding such links in the search process helps avoid loops where the same sequence of link weight adjustments is tried over and over again.

Figure 2:
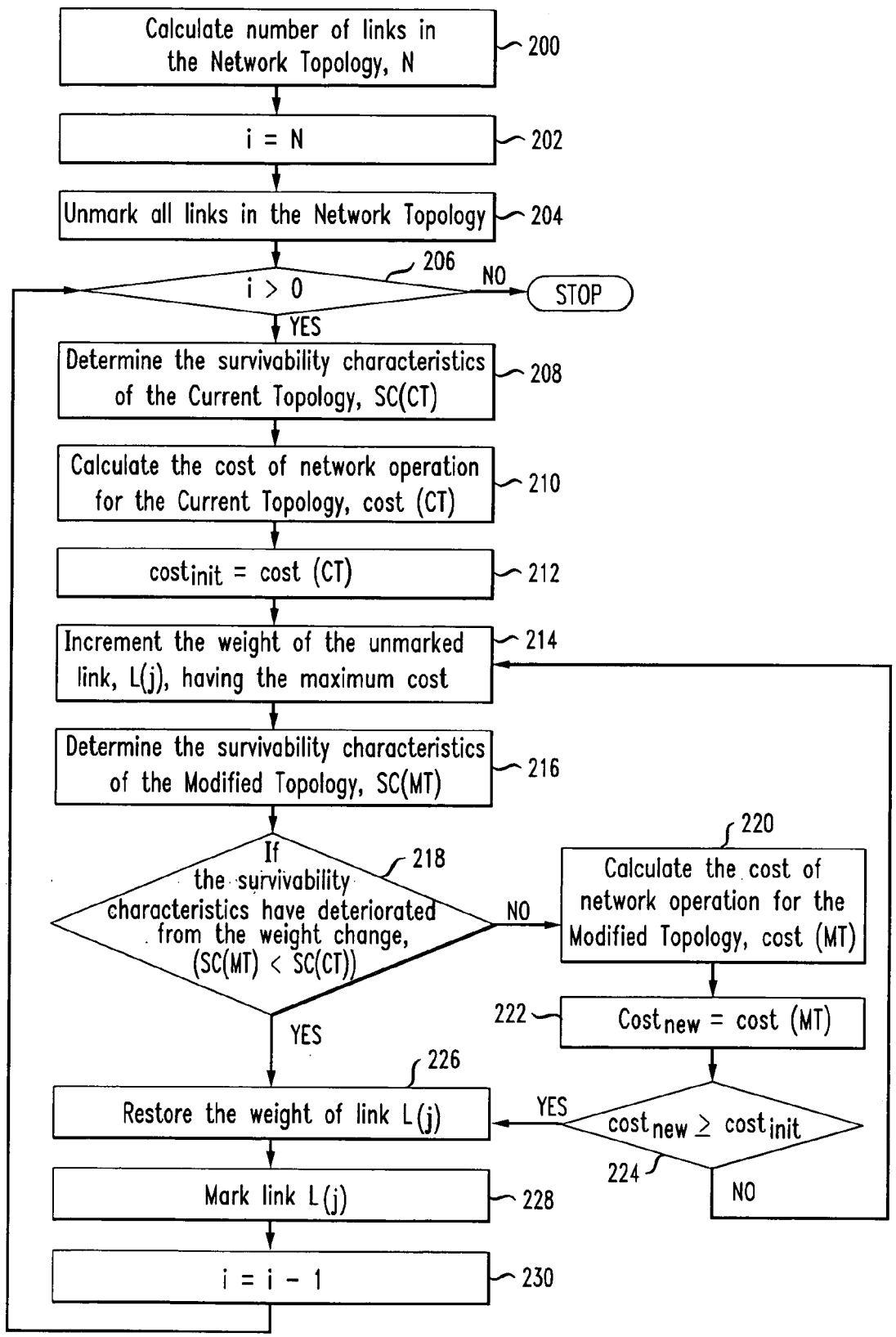
FIG. 2 is a flowchart illustrating a process of adjusting link weights for a network topology model having a plurality of nodes connected by links to reduce the cost of network operation.

Referring to FIG. 2, a flowchart illustrating the process of adjusting link weights for a network topology model having a plurality of nodes connected by links to reduce the cost of network operation in accordance with the present invention is depicted. The initial steps 200, 202 initialize parameters N and i for processing where: N represents the total number of links in the network topology and i is a counter for tracking the processing of each link in the network topology. In the next step 204, all of the links in the network topology are unmarked. Steps 206 and 230, form the main loop for this process where the number of remaining links, i, to be processed is ascertained. Once the number of remaining links, i, equals 0 the process stops at step 206. Otherwise, preferably the survivability characteristics of the current topology, SC(CT), are determined at step 208. The cost of the network operation for the Current Topology, cost (CT), is calculated next at step 210 and $\text{cost}_{init}$ is set equal to the cost of the network operation for the Current Topology, cost (CT), at step 212. The weight of unmarked link, L(j), having the maximum cost is incremented next at step 214 to modify the network topology. The survivability characteristics of the Modified Topology, SC(MT), are also preferably determined at step 216. If the survivability characteristics of the network topology have deteriorated from the weight change ((SC(MT) is less than SC(CT)) 218, then the weight of the link, L(j), is restored at step 226. Otherwise, the cost of the network operation for the Modified Topography, cost (MT), is calculated at step 220, and $\text{cost}_{new}$ is set equal to cost (MT) at step 222. If the $\text{cost}_{new}$ is greater than or equal to $\text{cost}_{init}$ 224, then the weight of the link L(j) is restored at step 226, the link L(j) is marked at step 228, and the counter i is reduced at step 230 before returning to step 206. Otherwise, the processing is returned to step 214 to increment the weight of the unmarked link, L(j).

In addition to incrementing the weight of the costliest links, the present invention includes: increasing the weight of the costliest link by more than a unit amount, increasing the weights of multiple high cost links simultaneously, decrementing the weights of one or more low cost links so as to make them more attractive, and adjusting the weights such that a high (low) cost link and a low (high) cost path connecting the ends of the high (low) cost link have the same weight. Many other similar heuristics are possible. However, the heuristics involving the weight adjustment of multiple links at a time in each step or significant change in the weight of a link are not preferred. This is because more than a small change in the link weight distribution can significantly alter the traffic distribution on the links in very complex ways. Hence the simple heuristics involving only a small change at a time perform better than others.

Figure 3B:
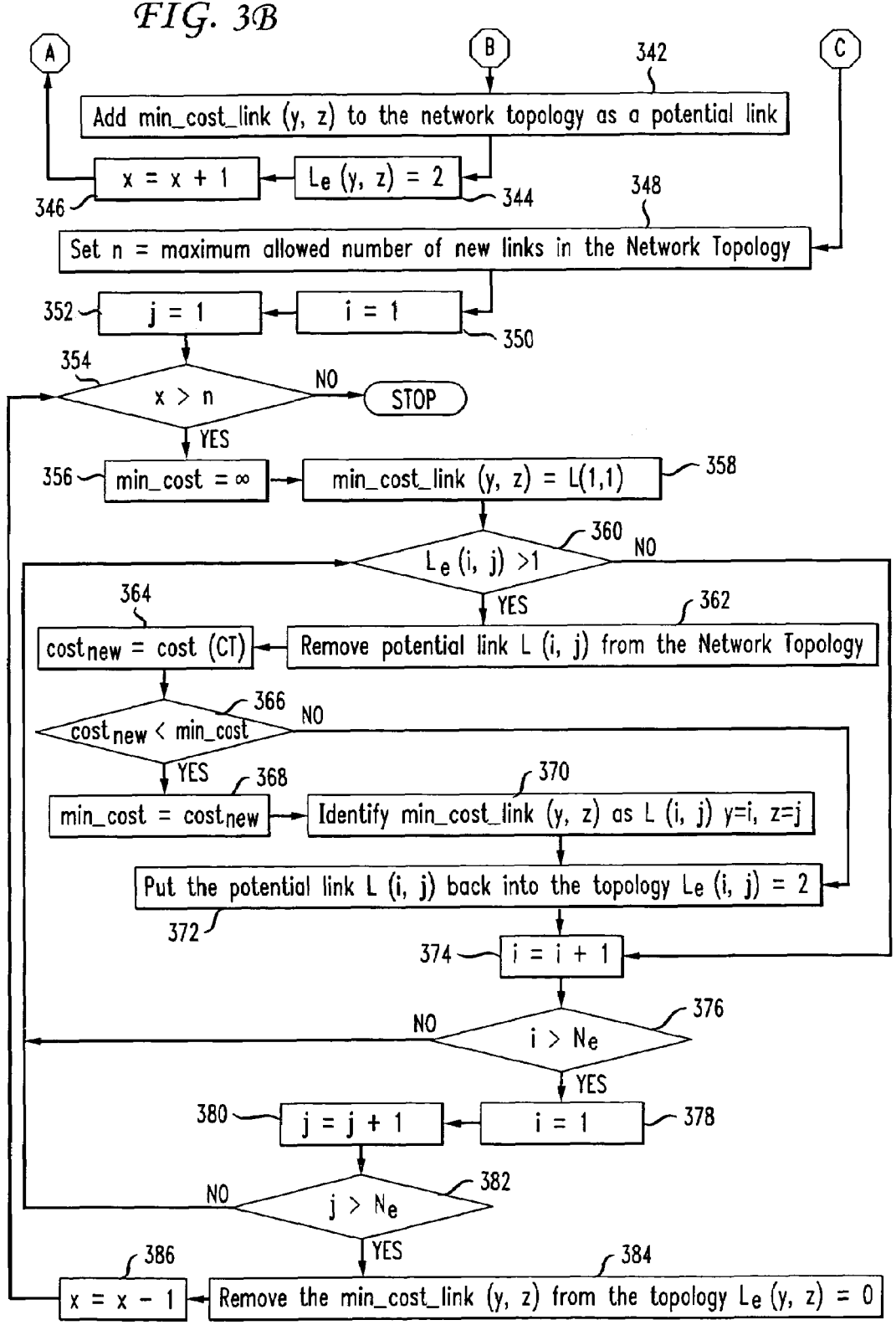

Referring to FIGS. 3A and 3B, a flowchart illustrating the process of adding links to a network topology model having a plurality of nodes connected by existing links to reduce the cost of network operation in accordance with the present invention is depicted. The process of adding new links to the topology begins with identifying a pool of potential new links and temporarily adding them to the topology. The potential new links are identified using an iterative process where in each iteration the link whose addition will lead to maximum reduction in the current $cost_{protection}$ value is selected. Once all the potential new links have been identified and added to the topology, the least useful links among them are eliminated one by one until only the desired number of new links remain in the topology. While a good size for the pool of potential links and the optimal number of new links to be added depends on the existing topology, preferred initial ranges for practicing the invention include the addition of about 5 to 15% more new links based upon an initial potential new link pool size of about 80 to 120% of the original number of links in the existing topology.

Referring to the portion of FIGS. 3A and 3B between flowchart identifiers 300 and 346, the initial steps 300, 302 and 304 initialize parameters $N_e$, $L_e(i,j)$, and x. $N_e$ represents the total number of nodes in the existing topology and $L_e(i,j)$ corresponds to an array for identifying the links in the existing topology by their nodal connectivity where i and j represent a node number. The array is preferably at least a two dimensional array. The values for $L_e(i,j)$ are set equal to one where a link exists between nodes i and j, and for locations in the array where i equals j while all other values in the array are initially set equal to zero. In step 302, the value of N is set equal to the maximum number of allowed potential new links that will be considered for addition to the existing topology. In step 304, a counter x is set to 0 where x represents the current amount of new potential links added to the existing topology.

Steps 306 and 346, define the main loop for adding the new potential links, which continues until N number of links have been added to the existing topology. Steps 308, 310, 312, and 314 further initialize the loop with parameters i, j, min_cost, and min_cost_link (y, z) for processing. The parameters i and j refer to node numbers for identifying a potential new link, L (i, j), to be added to the existing topology. The min_cost parameter is initially set equal to a very large value (infinity) in step 312, and is used to track the cost associated with the new potential link that minimizes the cost of network operation at step 326. The min_cost_link (y, z) tracks the identification of the new potential link, (L (j), by its nodal coordinates that results in the minimum cost of network operation. In step 316, the algorithm checks to determine whether there is an existing link between node numbers i and j by determining whether array $L_e$ (i, j) has a value that is less than 1. If there is an existing link or a potential link has already been added, the value of $L_e$ (i, j) will be greater than or equal to 1 and the processing will be forwarded to step 332 for incrementing the node number corresponding to i. Otherwise, link L (i, j) will be added to the network topology at step 318, and the cost of network operation for the Current Topology, cost (CT), will be calculated at step 320. In step 322, a cost tracking parameter $cost_{new}$ is assigned the value of cost(CT). If $cost_{new}$ is less than the min_cost at step 324, then min_cost is assigned the value of $cost_{new}$ 326 and min_cost_link (y, z) is identified as corresponding to potential link L (i, j). This can generally be accomplished by assigning the values of y and z to the respective corresponding values of i and j at step 328.

The new potential link, L (i, j) is then removed from the network topology for further consideration of other potential new links 330. Steps 332, 334, 336, 338, and 340 increment both i and j so that each new potential link is considered in finding the potential link which results in the maximum reduction in cost of network operation. Once the link is identified (j>$N_e$ at step 340), the link, min_cost_link (y, z), is added to the network topology as a potential new link at step 342. In step 344, the array of links, $L_e$ (i, j), value for the new potential link is set equal to 2. This process continues until x is incremented to equal N representing that N number of new potential links have been added to the existing network topology 306, 346.

Referring to the portion of FIG. 3B between flowchart identifiers 348 and 386, the least useful potential links are next eliminated from the network topology until only the desired number of new links remain in the topology. The initial steps 348, 350 and 352 initialize parameters n, i, and j for processing where: n represents the maximum number of allowed new links to be added to the network topology and i and j identify node numbers. The main loop of this portion of the algorithm loops between steps 354 and 386, which reduces counter x corresponding to the current number of new links added to the network topology. Once the number of new links x has been reduced to be equal to n, the processing stops at step 354. Otherwise, processing continues to find the potential new links that when removed from the current network topology will result in lowest cost of network operation. The min_cost parameter is again initially set to a large number (infinity) at step 356 and the min_cost_link (y, z) is initialized as well at step 358. In step 360, the algorithm ascertains whether a link identified in array $L_e$ (i, j) is a potential new link. If the value of $L_e$ (i, j) is less than or equal to one, the processing increments to the next node 374 as there either was no link corresponding to the $L_e$ (i, j) or it corresponded to an existing link. Otherwise, the link, $L_e$ (i, j) is removed from the network topology to calculate the cost of the network operation for the Current Topology at step 362 which is assigned to parameter $cost_{new}$ at step 364.

In the next step 366, if cost of the network operation for the Current Topology is not less than the value associated with the min_cost parameter, then the potential new link L (i, j) is put back into the network topology ($L_e$ (i, j) in step 372. Otherwise, the min_cost parameter is assigned the $cost_{new}$ value at step 368 and the min_cost_link (y, z) identifier is set to correspond to the currently removed potential link, L (i, j), at step 370. In the next step 372, the link L (i, j) is placed back into the topology for further consideration in identifying a link that when removed would result in the maximum reduction in the cost of network operation. Steps 374, 376, 378, 380, and 382 define a looping structure for analyzing each of the potential new links to identify the link which when removed will result in the lowest value of min_cost. Once the min_cost value is determined (j>$N_e$ at step 382), the corresponding link, min_cost_link (y, z), is known and is removed from the topology 384. This process is repeated until the number of new potential links is reduced to the maximum number of allowed new links, n, in the network topology 354, 386.

IV. Load Balancing and the Cost of Network Operations for Survivability

Load balancing in IP networks has traditionally been associated with achieving efficient utilization of network resources by adjusting the route traffic takes so that traffic loads move from high utilization (or congested) links to low utilization links. For a given topology and traffic matrix, a straightforward metric for measuring the degree of load balance is the standard deviation among link utilization values. The smaller the standard deviation among link utilizations, the better is the degree of load balance in the network. From a quality of service point of view, it is important that link utilization values do not become very high, so that the link can easily accommodate transient increase in the traffic load. However, a dilemma is encountered when the problem of load balancing is combined with the problem of reducing $cost_{protection}$. The solutions to both these problems involve traffic route adjustments, but it can work in a conflicting manner. That is, the route adjustments designed to reduce the standard deviation among link utilizations may increase the $cost_{protection}$ (or worse—make the hitherto failure-proof network susceptible to link/node failures) and vice versa.

The iterative weight adjustment process described in Section III-A can be modified so that the objective is reducing the imbalance in link utilization values, rather than reducing the cost of survivability. Here, the link utilization is measured as the ratio of the traffic load on the link during failure-free operation to the required link capacity for single node failure protection. The modification consists of incrementing the weight of the most heavily utilized link (rather than the costliest link). The weight adjustment will alter the traffic routes, thereby causing the required link capacities for single node failure protection and the load on the links during failure free operation to change. The new link utilization values as well as the new value of standard deviation among link utilizations are calculated. The weight adjustment is accepted if it does not make the network susceptible to single node failures and the new value of standard deviation among link utilizations is less than the old value.

Figure 4:
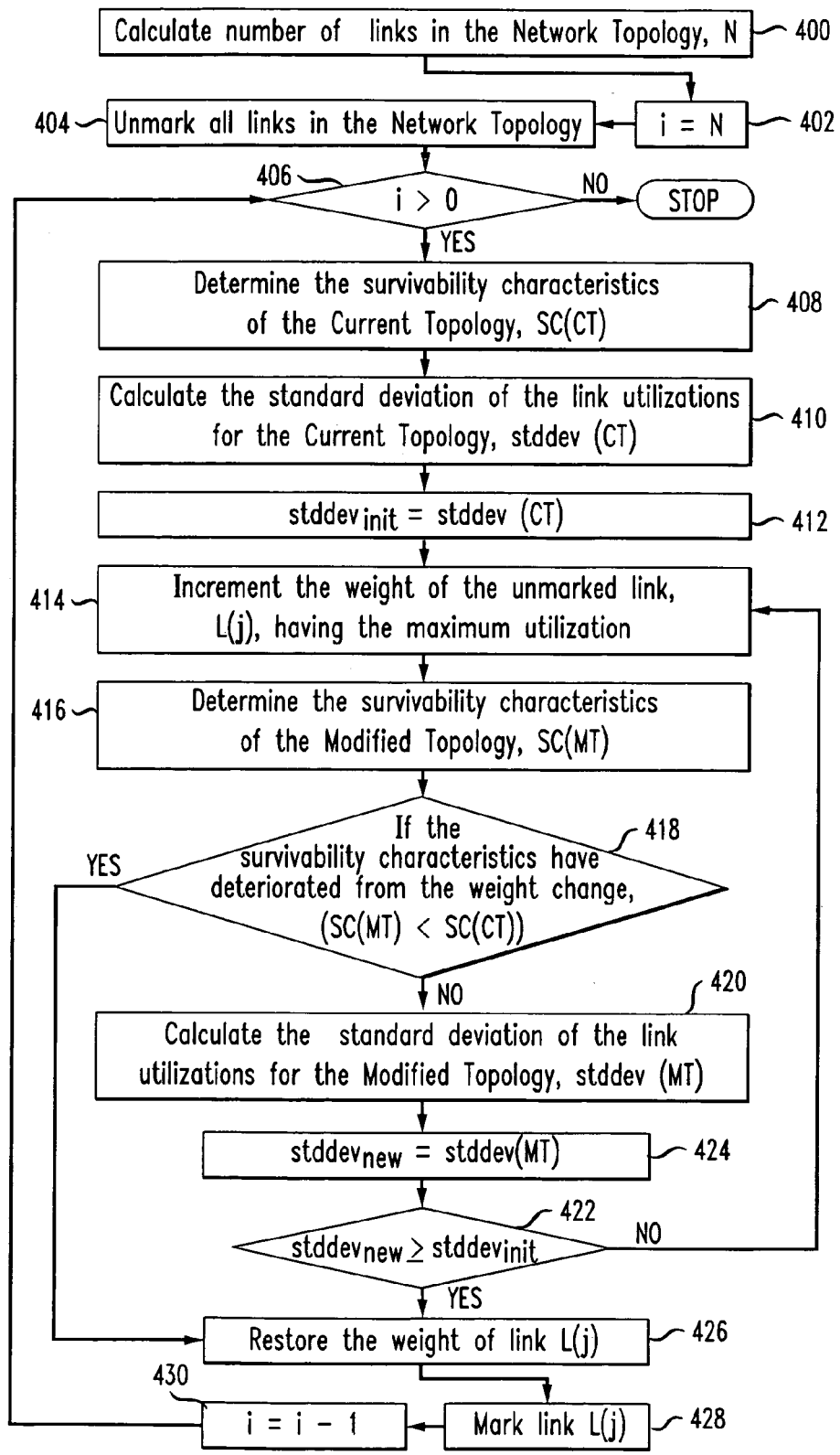
FIG. 4 is a flowchart illustrating a process of adjusting link weights in a network topology model having a plurality of nodes connected by links to reduce an imbalance in link utilizations.

Referring to FIG. 4, a flowchart illustrating the process of adjusting link weights for a network topology model having a plurality of nodes connected by links to reduce an imbalance in link utilizations in accordance with the present invention is depicted. The initial steps 400, 402 initialize parameters N and i for processing where: N represents the total number of links in the network topology and i is a counter for tracking the processing of each link in the network topology. The next step 404 unmarks all of the links in the network topology. Steps 406 and 430 form the main loop, with the number of remaining links, i, to be processed being considered at step 406. Once the number of remaining links, i, equals 0, the process stops at step 406. Otherwise, preferably the survivability characteristics of the current topology, SC(CT), are determined at step 408. The standard deviation of the link utilizations for the Current Topology, stddev (CT), is calculated next at step 410 and $stddev_{init}$ is set equal to the standard deviation of the network operation for the current topology, stddev (CT), at step 412. The weight of unmarked link, L(j), having the maximum utilization is incremented next at step 414 to modify the network topology. Preferably the weight of unmarked link, L(j), at step 414 is incremented by 1.

The survivability characteristics of the Modified Topology, SC(MT), are also preferably determined at step 416. If the survivability characteristics of the network topology have deteriorated from the weight change ((SC(MT) is less than SC(CT)) 418, then the weight of the link, L(j), is restored at step 426. Otherwise, the standard deviation of the link utilizations for the Modified Topology, stddev (MT), is calculated at step 420, and $stddev_{new}$ is set equal to stddev (MT) at step 422. If the stddev is greater than or equal to $stddev_{init}$ at step 424, then the weight of the link L(j) is restored at step 426, the link L(j) is marked at step 428, and the counter i is reduced at step 430 before returning to step 406. Otherwise, the processing is returned to step 414 for further incrementing the weight of the unmarked link, L(j).

Through experimentation with the present invention, it has been observed that weight adjustments performed for one objective may not compliment another objective. In particular, weight adjustments designed to reduce standard deviation in link utilizations can indeed be effective, but may increase the cost of network operation. In addition, the weight adjustments designed to reduce the cost of network operation may increase the standard deviation among link utilizations significantly in some cases.

The present invention also includes a two step weight adjustment process to achieve both goals simultaneously. The first step in this process consists of adjusting link weights so as to reduce the $cost_{protection}$ without deteriorating the degree of load balancing. The second step consists of weight adjustments so as to improve the load balancing without increasing the $cost_{protection}$ on the topology obtained after the first step.

Since the weight adjustments can generally achieve either better load balance or reduced $cost_{protection}$, and generally not both, preferably a choice is made regarding the main objective for weight adjustments. A better balance in link utilizations can also be achieved by increasing the capacity of highly utilized links. Hence, minimizing the $cost_{protection}$ without deteriorating the degree of load balancing is an appropriate objective for the weight adjustments. Once the link weights have been adjusted so as to achieve the maximum possible reduction in the $cost_{protection}$ without deteriorating the degree of load balance, the link capacities can then be increased so that all the link utilizations are below a threshold value. Increasing the link capacities will necessarily increase the $cost_{protection}$. However, the resulting increase in the $cost_{protection}$ might be less than the corresponding increase if load balancing was attempted as the primary goal of weight adjustments.

Figure 5A:
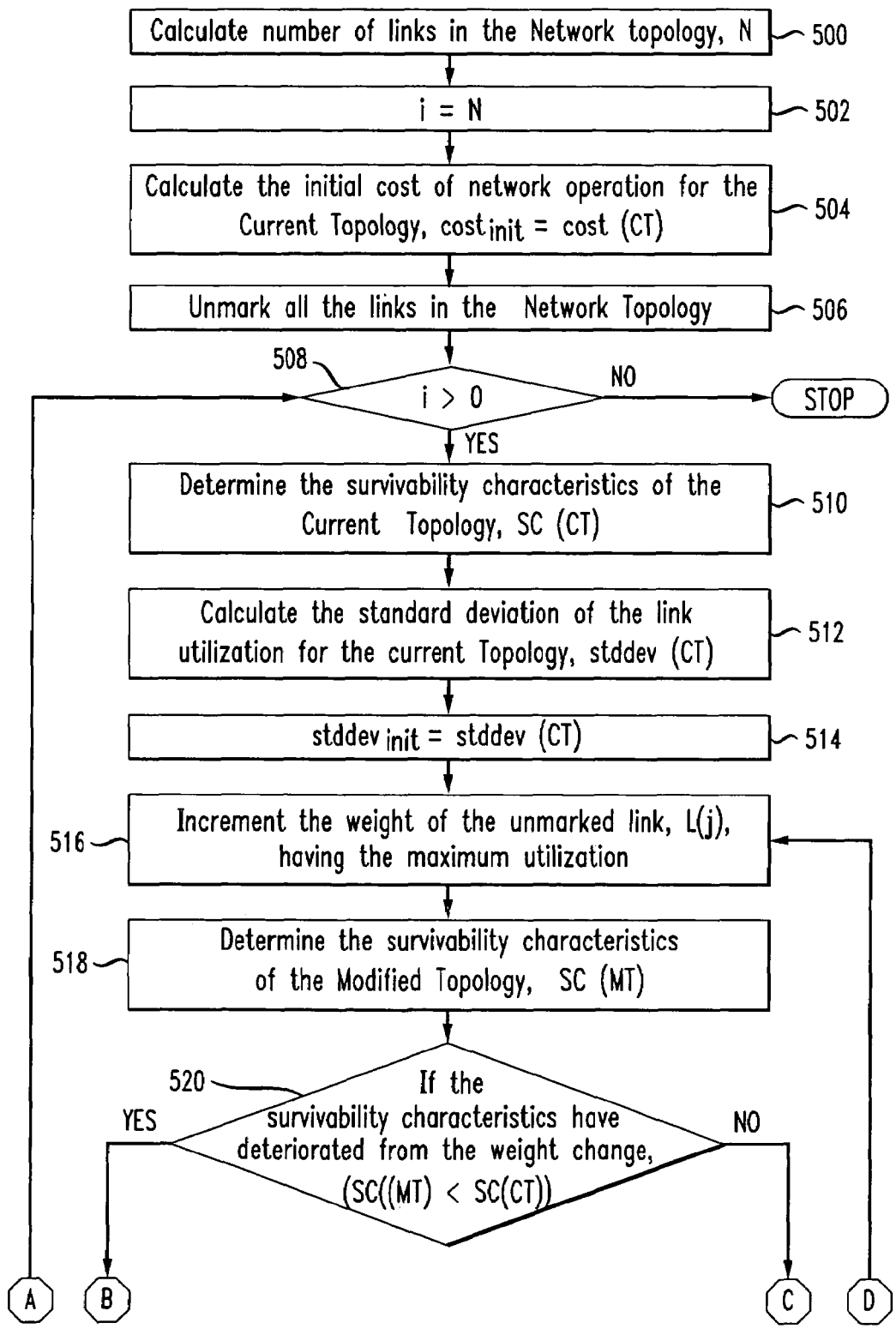
FIGS. 5A and 5B are a flowchart illustrating a process of adjusting link weights in a network topology model having a plurality of nodes connected by links to reduce an imbalance in link utilizations without deteriorating the cost of network operation.
Figure 5B:
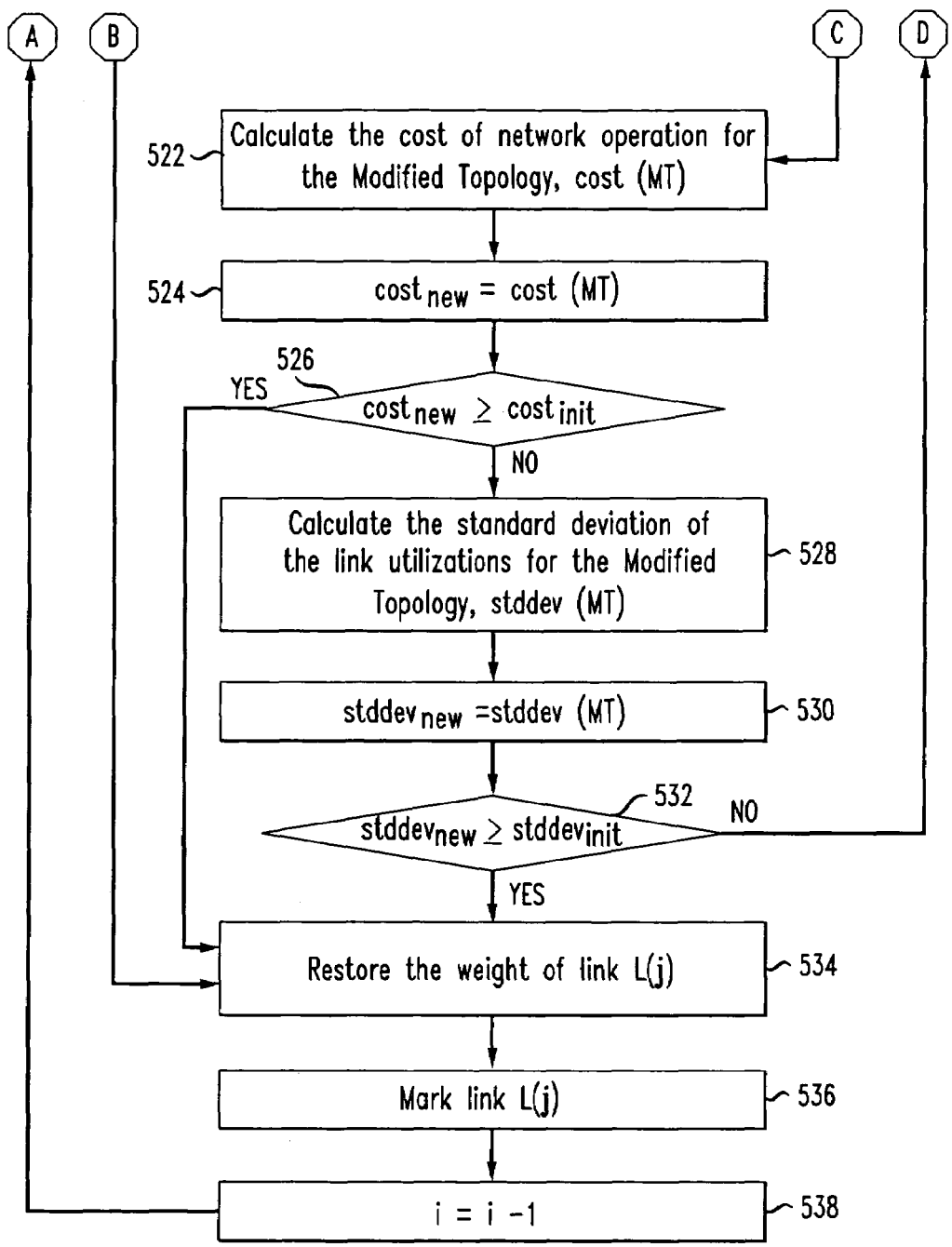

Referring to FIGS. 5A and 5B, a flowchart illustrating the process of adjusting link weights in a network topology model having a plurality of nodes connected by links to reduce an imbalance in link utilizations without deteriorating the cost of network operation in accordance with the present invention is depicted. The initial steps 500, 502, 504 and 506 initialize parameters: N, i, and $cost_{init}$, and unmark all of the links in the network topology. The parameter N represents the number of links in the network topology while i represents a counter that tracks the processing of each link in the network topology. In step 504, the initial cost of network operation for the Current Topology, cost (CT), is calculated and a value is assigned to parameter $cost_{init}$. In step 506, all of the links in the network topology are unmarked for processing. The main loop of the algorithm is defined by steps 508 and 538 where the value of i is decremented at 538 and checked at 508 to ensure that each link in the network topology is processed. In step 510, the survivability characteristics of the Current Topology, SC(CT), are preferably determined. Next in step 512, the standard deviation of the link utilization for the Current Topology, stddev(CT), is calculated and the value is assigned to parameter $stddev_{init}$ at step 514. In step 516, the weight of the unmarked link, L(j), having the maximum utilization associated therewith is incremented to modify the network topology.

In step 518, the survivability characteristics of the Modified Topology, SC (MT), are again preferably determined. In step 520, the survivability characteristics of the Current Topology and the Modified Topology are compared. If the survivability characteristics have deteriorated from the weight change, the processing is forwarded to restore the weight of the link L (j) at step 534. Otherwise, the cost of network operation for the Modified Topology, cost(MT), is calculated at step 522, and the value is assigned to parameter $cost_{new}$ at step 524. In step 526, if the cost is greater than or equal to the initial cost of network operation, $cost_{init}$, then the processing proceeds to step 534 to restore the weight of link L(j). Otherwise, the standard deviation of the link utilizations for the Modified Topology, stddev(MT), is calculated and the value is assigned to $stddev_{new}$ at step 530. In step 532, the standard deviation of the link utilizations for the modified topology, $stddev_{new}$, is compared against the standard deviation of the link utilizations for the Current Topology, $stddev_{init}$. If the standard deviation of the link utilizations has increased as a result of the weight change, the weight of the link L(j) is restored at step 534, and the link L(j) is marked at step 536 and the processing returns to step 508 for processing the next unmarked link, L(j) having the maximum cost associated therewith. Otherwise, the processing at step 532 will return to step 516 for the further incrementing of the weight of the link L(j).

Figure 6A:
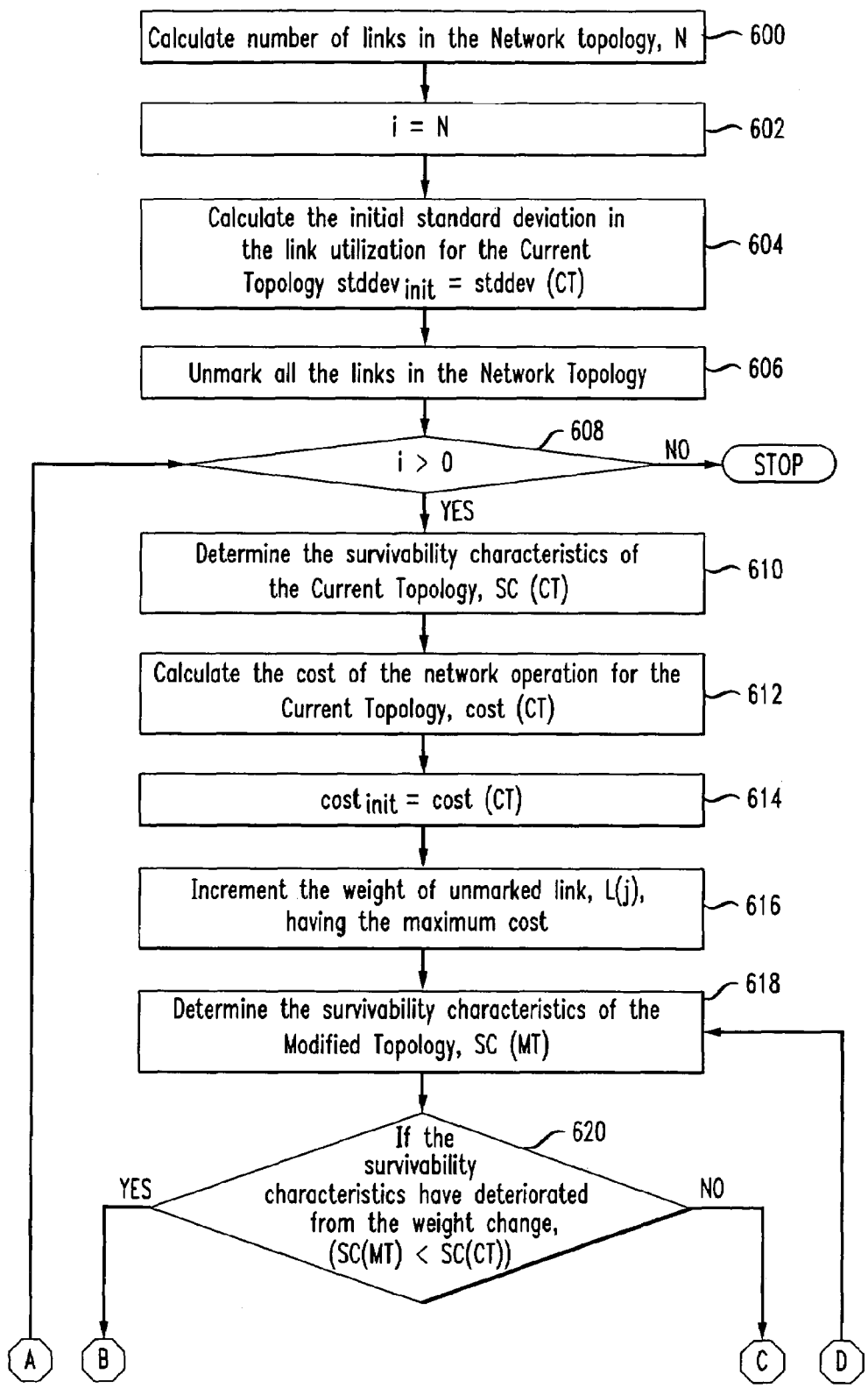
FIGS. 6A and 6B are a flowchart illustrating a process of adjusting link weights in a network topology model having a plurality of nodes connected by links to reduce the cost of network operation without increasing an imbalance in link utilizations.
Figure 6B:
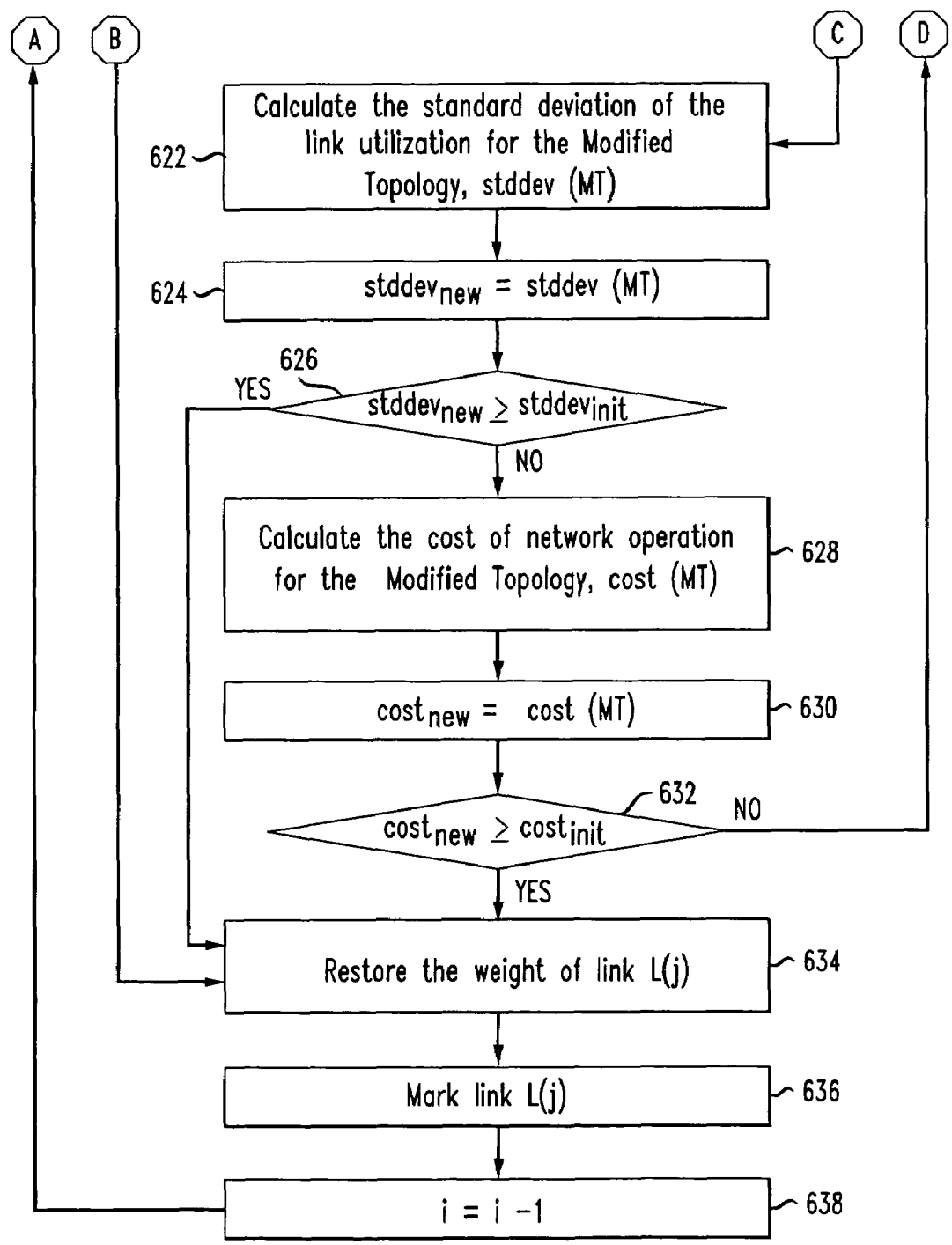

Referring to FIGS. 6A and 6B, a flowchart illustrating the process of adjusting link weights in a network topology model having a plurality of nodes connected by links to reduce the cost of network operation without increasing an imbalance in link utilizations in accordance with the present invention is depicted. The initial steps 600, 602, 604 and 606 initialize parameters: N, i, and $stddev_{init}$, and unmark all of the links in the network topology. The parameter N represents the number of links in the network topology while i represents a counter that tracks the processing of each link in the network topology. In step 604, the initial standard deviation in the link utilization for the Current Topology, stddev(CT), is calculated and a value is assigned to parameter $stddev_{init}$. In step 606, all of the links in the network topology are unmarked for processing. The main loop of the algorithm is defined by steps 608 and 638 where the value of i is decremented at 638 and checked at 608 to ensure that each link in the network topology is processed. In step 610, the survivability characteristics of the Current Topology, SC(CT), are preferably determined. Next in step 612, the cost of the network operation for the Current Topology, cost (CT), is calculated and the value is assigned to parameter $cost_{init}$ at step 614. In step 616, the weight of the unmarked link, L(j) having the maximum cost associated therewith is incremented to modify the network topology. In step 618, the survivability characteristics of the Modified Topology, SC(MT), are preferably again determined.

In step 620, the survivability characteristics of the Current Topology and the Modified Topology are compared. If the survivability characteristics have deteriorated from the weight change, the processing is forwarded to restore the weight of the link L(j) at step 634. Otherwise, the standard deviation of the link utilization for the Modified Topology, stddev (MT), is calculated at step 622, and the value is assigned to parameter $stddev_{new}$ at step 624. In step 626, if the $stddev_{new}$ is greater than or equal to the initial standard deviation of the link utilization, $stddev_{init}$, then the processing proceeds to step 634 to restore the weight of link L(j). Otherwise, the cost of network operation for the Modified Topology, cost (MT), is calculated and the value is assigned to $cost_{new}$ at step 630. In step 632, the cost of network operation for the Modified Topology, $cost_{new}$ is compared against the cost of network operation for the Current Topology, $cost_{init}$. If the cost of network operation has increased as a result of the weight change, the weight of the link L(j) is restored at step 634, the link L(j) is marked at step 636, and the processing returns to step 608 for processing the next unmarked link, L(j), having the maximum cost associated therewith. Otherwise, the processing at step 632 will return to step 616 for the further incrementing of the weight of the link L(j).

Figure 7A:
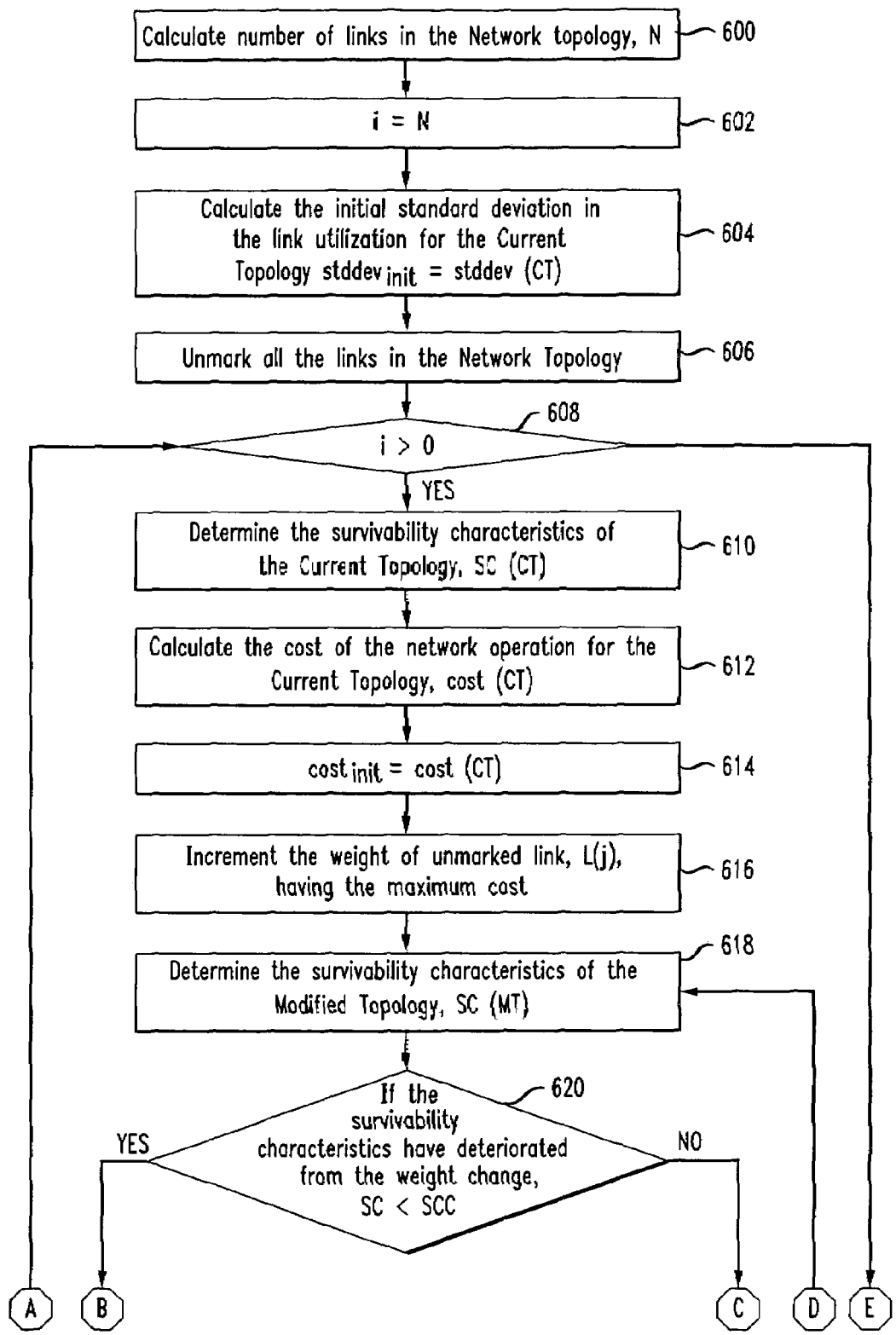
FIGS. 7A and 7B are a flowchart illustrating the process of adjusting link weights to reduce the cost of network operation without increasing the imbalance in link utilizations while keeping the utilization for each link below a specific threshold.
Figure 7B:
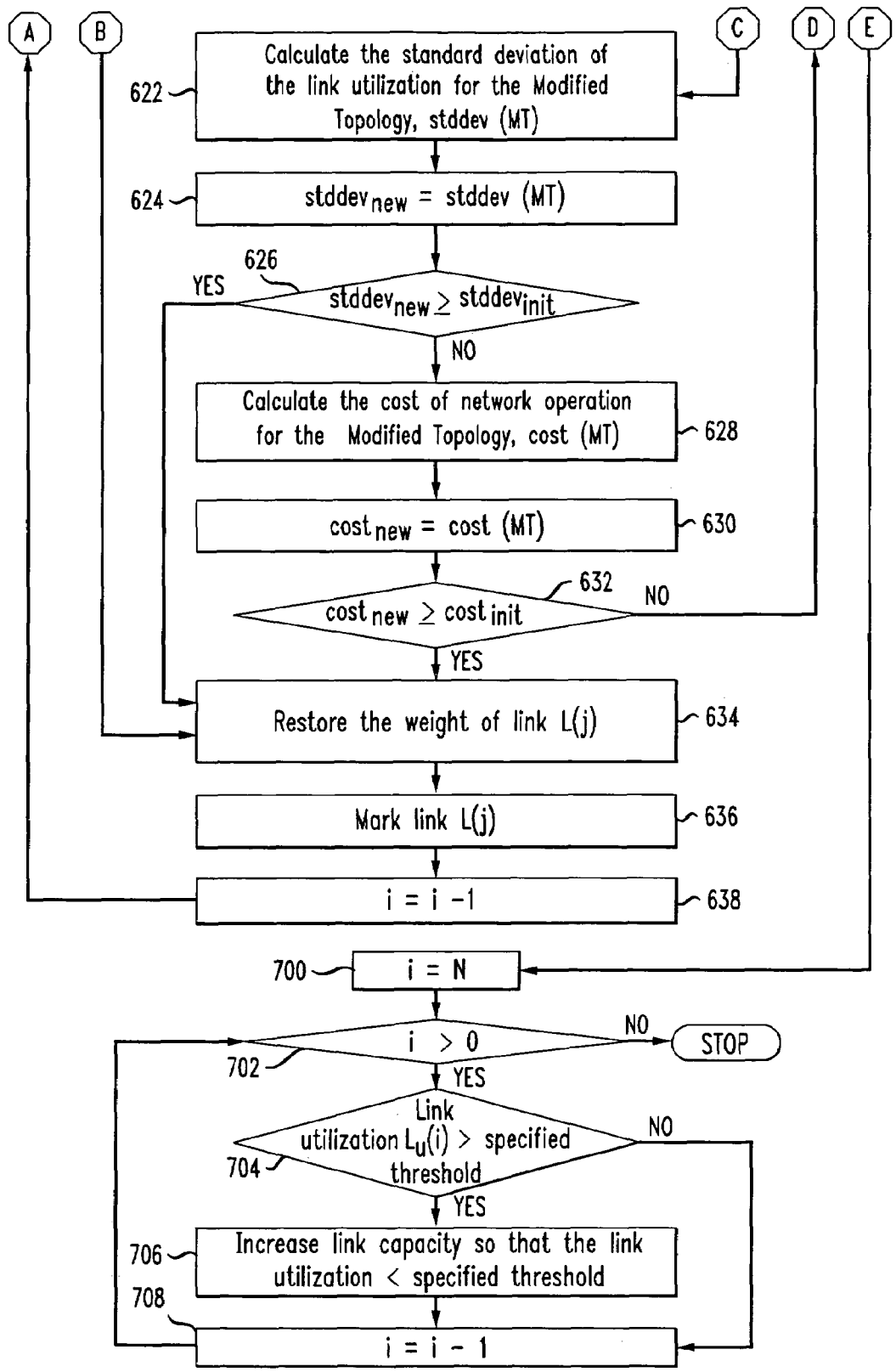

Referring to FIGS. 7A and 7B, a flowchart illustrating the process of adjusting link weights to reduce the cost of network operation without increasing the imbalance in link utilizations while keeping the utilization for each link below a specific threshold in accordance with the present invention is depicted. The portion of the flowchart illustrating the process of adjusting link weights in a network topology model having a plurality of nodes connected by links to reduce the cost of network operation without increasing an imbalance in link utilizations has been described above in connection with FIGS. 6A and 6B and accordingly the same flowchart identifiers 600 through 638 have been relisted in FIGS. 7A and 7B. The current flowchart includes an additional loop between steps 700 and 708 to increase the link capacities so that no link utilization exceeds a specified value.

Referring to FIG. 7B, the initial step 700 re-initializes parameter i for tracking the processing of each link in the network topology. The loop of the algorithm is defined by steps 702 and 708 where the value of i is decremented at 708 and checked at 702 to ensure that each link in the network topology is processed. In step 704, The link utilization of link i, $L_u(i)$, is checked against a specified threshold. If the link utilization, $L_u(i)$, is greater than the specified threshold, the link capacity of the link, L(i), is increased so that the link utilization, $L_u(i)$, falls below the specified threshold in step 706. A preferred range for setting the specified threshold is about 0.6 to 0.9, and is most preferably about 0.7. Otherwise, the processing is forwarded to step 708 for processing the next link.

The present invention can be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product, which is a storage medium including instructions that can be used to program a computer to perform processes of the invention. The storage medium can include, but is not limited to, any type of disk including floppy disks, optical discs, Compact Disk Read Only Memory (CD-ROMs), and magnetic disks, Read-Only Memory (ROMs), Random-Access Memory (RAMs), Electrically Programmable Read-Only Memory (EPROMs), Electrically Erasable Programmable Read-Only Memory (EEPROMs), magnetic or optical cards, or any type of media suitable for storing electronic instructions.

Stored on any one of the above described storage media (computer readable media) the present invention includes programming for controlling both the hardware of the computer and for enabling the computer to interact with a human user. Such programming may include, but is not limited to, software for implementation of device drivers, operating systems, and user applications. Such computer readable media further includes programming or software instructions to direct the general purpose computer to perform tasks in accordance with the present invention.

The invention may also be implemented by the preparation of application specific units, such as integrated circuits (ASIC) or by interconnecting an appropriate network of conventional circuit components, as will be readily apparent to those skilled in the art.

Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A method for increasing the capability of a network topology model having a plurality of nodes connected by existing links to maintain service continuity in the presence of faults, said method comprising:
   (a) adding new links to the network topology model to protect against single node failures; and
   (b) adjusting link weights for the network topology model to reduce at least one of a cost of network operation, and an imbalance in link utilizations;
   wherein step (a) comprises the sub-steps of:
   (1) failing one of the plurality of nodes in the network topology;
   (2) calculating a first number of disconnected node pairs;
   (3) selecting a pair of nodes which are neighbors to the failed node;
   (4) adding a new link between the pair of nodes;
   (5) calculating a second number of disconnected node pairs;
   (6) retaining the new link and setting the first number equal to the second number when the second number is less than the first number;
   (7) repeating sub-steps (3) through (6) for randomly selected combinations of pairs of neighbor nodes until the first number equals zero;
   (8) repeating sub-steps (1) through (7) for each of the plurality of nodes in the network topology as modified by the addition of the retained links;
   (9) removing one of the plurality of retained links in the modified network topology;
   (10) restoring the removed link when the removal causes any node pair to become disconnected for any single node failure; and
   (11) repeating sub-steps (9) through (11) for each of the plurality of retained new links in the modified network topology.

2. A method for increasing the capability of a network topology model as defined in claim 1, wherein said adjusting link weights in step (b) is performed to reduce said imbalance in link utilizations without deteriorating said cost of network operation.

3. A method for increasing the capability of a network topology model as defined in claim 2, wherein step (b) comprises the sub-steps of:
   (1) calculating a network cost for operating the current network topology based upon a link cost associated with each link;
   (2) unmarking said each link in the network topology;
   (3) calculating a standard deviation of link utilization for the current topology;
   (4) incrementing the weight of one of said each link in the current network topology having the maximum utilization to modify the network topology;
   (5) calculating a network cost for operating the modified network topology;
   (6) calculating a standard deviation of link utilization for the modified network topology;
   (7) restoring the weight and marking said one of said each link having the maximum link cost when at least one of:
   the network cost for operating the modified network topology is greater than or equal to the network cost for operating the current network topology; and
   the standard deviation of link utilization for the current topology is less than the standard deviation of link utilization for the modified topology; and
   (8) repeating sub-steps (4) through (7) until said each link in the network topology is marked.

4. A method for increasing the capability of a network topology model as defined in claim 3, wherein:
   said sub-step (3) in step (b) further comprises determining survivability characteristics of the current network topology;
   said sub-step (5) in step (b) further comprises determining the survivability characteristics of the modified network topology; and
   said sub-step (7) in step (b) for restoring the weight and marking the link having the maximum link cost is performed when at least one of:
   the survivability characteristics of the modified network has deteriorated in comparison to the survivability characteristics of the current network topology;
   the network cost for operating the modified network topology is greater than or equal to the network cost for operating the current network topology; and
   the standard deviation of link utilization for the current topology is less than the standard deviation of link utilization for the modified topology.

5. A method for increasing the capability of a network topology model as defined in claim 1, wherein said adjusting link weights in step (b) is performed to reduce said cost of network operation without increasing said imbalance in link utilizations.

6. A method for increasing the capability of a network topology model as defined in claim 5, wherein step (b) comprises the sub-steps of:
   (1) calculating a standard deviation of link utilization for the current network topology;
   (2) unmarking each link in the network topology;
   (3) calculating a network cost for operating the current network topology based upon a link cost associated with said each link;
   (4) incrementing the weight of one of said each link in the current network topology having the maximum cost to modify the network topology;
   (5) calculating a network cost for operating the modified network topology;
   (6) calculating a standard deviation of link utilization for the modified network topology;
   (7) restoring the weight and marking said one of said each link having the maximum link cost when at least one of:
   the network cost for operating the modified network topology is greater than or equal to the network cost for operating the current network topology; and
   the standard deviation of link utilization for the current network topology is less than the standard deviation of link utilization for the modified network topology; and
   (8) repeating sub-steps (3) through (7) until said each link in the network topology is marked.

7. A method for increasing the capability of a network topology model as defined in claim 6, wherein:

said sub-step (3) in step (b) further comprises determining survivability characteristics of the current network topology;

said sub-step (5) in step (b) further comprises determining the survivability characteristics of the modified network topology; and said sub-step (7) in step (b) for restoring the weight and marking the link having the maximum link cost is performed when at least one of:

the survivability characteristics of the modified network has deteriorated in comparison to the survivability characteristics of the current network topology;

the network cost for operating the modified network topology is greater than or equal to the network cost for operating the current network topology; and the standard deviation of link utilization for the current network topology is less than the standard deviation of link utilization for the modified network topology.

8. A method of adjusting link weights as defined in claim 6, further comprising the sub-step of step (b):

(9) increasing the link capacity such that the link utilization is no longer higher than a specified threshold.

9. A method for increasing the capability of a network topology model as defined in claim 1, wherein said adjusting link weights in step (b) is performed to reduce said cost of network operation without increasing said imbalance in link utilizations while keeping the utilization for each link below a specific threshold.

10. A method for increasing the capability of a network topology model as defined in claim 1, further comprising the step of:

(c) adding links to the network topology model to reduce the cost of network operation.

11. A method for increasing the capability of a network topology model as defined in claim 10, wherein step (c) comprises the sub-steps of:

(1) selecting a maximum number of potential links to be added to the network topology;

(2) selecting a maximum number of new links to be added to the network topology;

(3) finding a potential link that when added to the current network topology will result in a maximum reduction in the cost of network operation;

(4) adding the potential link to the current network topology;

(5) repeating sub-steps (3) and (4) until the maximum number of potential links have been added to the current network topology;

(6) finding the potential link that when removed from the current network topology will result in the lowest cost of network operation;

(7) removing the potential link from the current network topology;

(8) repeating sub-steps (6) and (7) until the maximum number of potential links is reduced to the maximum number of new links to be added to the network topology.

12. A method for increasing the capability of a network topology model as defined in claim 1, wherein said adjusting link weights for the network topology model to reduce the cost of network operation in step (b) comprises the sub-steps of:

(1) unmarking each link in the network topology;

(2) calculating a network cost for operating the current network topology based upon a link cost associated with said each link;

(3) incrementing the weight of one of said each link in the current network topology having the maximum link cost to modify the network topology;

(4) calculating a network cost for operating the modified network topology;

(5) restoring the weight and marking said one of said each link having the maximum link cost when the network cost for operating the modified network topology is greater than or equal to the network cost for operating the current network topology; and (6) repeating sub-steps (2) through (5) until said each link in the network topology is marked.

13. A method for increasing the capability of a network topology model as defined in claim 12, wherein:

said sub-step (2) in step (b) further comprises determining survivability characteristics of the current network topology;

said sub-step (4) in step (b) further comprises determining the survivability characteristics of the modified network topology; and said sub-step (5) in step (b) for restoring the weight and marking the link having the maximum link cost is performed when at least one of:

the survivability characteristics of the modified network has deteriorated in comparison to the survivability characteristics of the current network topology; and the network cost for operating the modified network topology is greater than or equal to the network cost for operating the current network topology.

14. A method for increasing the capability of a network topology model as defined in claim 1, wherein said adjusting link weights for the network topology model to reduce the imbalance in link utilizations in step (b) comprises the sub-steps of:

(1) unmarking each link in the network topology;

(2) calculating a standard deviation of link utilization for the current network topology;

(3) incrementing the weight of one of said each link in the current network topology having the maximum utilization to modify the network topology;

(4) calculating a standard deviation of link utilization for the modified network topology;

(5) restoring the weight and marking said one of said each link having the maximum utilization when the standard deviation of link utilization for the current topology is less than the standard deviation of link utilization for the modified topology; and (6) repeating sub-steps (2) through (5) until said each link in the network topology is marked.

15. A method for increasing the capability of a network topology model as defined in claim 14, wherein:

said sub-step (2) in step (b) further comprises determining survivability characteristics of the current network topology;

said sub-step (4) in step (b) further comprises determining the survivability characteristics of the modified network topology; and said sub-step (5) in step (b) for restoring the weight and marking the link having the maximum link cost is performed when at least one of:

the survivability characteristics of the modified network has deteriorated in comparison to the survivability characteristics of the current network topology; and the standard deviation of link utilization for the current topology is less than the standard deviation of link utilization for the modified topology.

16. A method for adding new links to a network topology model having a plurality of nodes connected by existing links to achieve protection against single node failures for Open Shortest Path First (OSPF) and Multiprotocol Label Switching (MPLS) based local recovery, said method comprising the steps of:

(a) failing one of the plurality of nodes in the network topology;

(b) calculating a first number of disconnected node pairs;

(c) selecting a pair of nodes which are neighbors to the failed node;

(d) adding a new link between the pair of nodes;

(e) calculating a second number of disconnected node pairs;

(f) retaining the new link and setting the first number equal to the second number when the second number is less than the first number;

(g) repeating steps (c) through (f) for randomly selected combination of the pair of nodes until the first number equals zero;

(h) repeating steps (a) through (g) for each of the plurality of nodes in the network topology as modified by the addition of the retained links;

(i) removing one of the plurality of retained links in the modified network topology;

(j) restoring the removed link when the removal causes any node pair to become disconnected for any single node failure; and (k) repeating steps (i) through (k) for each of the plurality of retained new links in the modified network topology.

17. A method for adjusting link weights for a network topology model having a plurality of nodes connected by links to reduce the cost of network operation, said method comprising the steps of:

(a) unmarking each link in the network topology;

(b) calculating a network cost for operating the current network topology based upon a link cost associated with said each link;

(c) incrementing the weight of one of said each link in the current network topology having the maximum link cost to modify the network topology;

(d) calculating a network cost for operating the modified network topology;

(e) restoring the weight and marking said one of said each link having the maximum link cost when the network cost for operating the modified network topology is greater than or equal to the network cost for operating the current network topology; and (f) repeating steps (b) through (e) until said each link in the network topology is marked;

wherein:

step (b) further comprises determining survivability characteristics of the current network topology;

step (d) further comprises determining the survivability characteristics of the modified network topology; and step (e) for restoring the weight and marking the link having the maximum link cost is performed when at least one of:

the survivability characteristics of the modified network has deteriorated in comparison to the survivability characteristics of the current network topology; and the network cost for operating the modified network topology is greater than or equal to the network cost for operating the current network topology.

18. A method of adjusting link weights in a network topology model having a plurality of nodes connected by links to reduce an imbalance in link utilizations, said method comprising the steps of:

(a) unmarking each link in the network topology;

(b) calculating a standard deviation of link utilization for the current network topology;

(c) incrementing the weight of one of said each link in the current network topology having the maximum utilization to modify the network topology;

(d) calculating a standard deviation of link utilization for the modified network topology;

(e) restoring the weight and marking said one of said each link having the maximum utilization when the standard deviation of link utilization for the current topology is less than the standard deviation of link utilization for the modified topology; and (f) repeating steps (b) through (e) until said each link in the network topology is marked.

19. A method for increasing the capability of a network topology model as defined in claim 18, wherein:

step (b) further comprises determining survivability characteristics of the current network topology;

step (d) further comprises determining the survivability characteristics of the modified network topology; and step for restoring the weight and marking the link having the maximum link cost is performed when at least one of:

the survivability characteristics of the modified network has deteriorated in comparison to the survivability characteristics of the current network topology; and the standard deviation of link utilization for the current topology is less than the standard deviation of link utilization for the modified topology.

20. A method of adjusting link weights in a network topology model having a plurality of nodes connected by links to reduce an imbalance in link utilizations without deteriorating the cost of network operation, said method comprising the steps of:

(a) calculating a network cost for operating the current network topology based upon a link cost associated with each link;

(b) unmarking said each link in the network topology;

(c) calculating a standard deviation of link utilization for the current topology;

(d) incrementing the weight of one of said each link in the current network topology having the maximum utilization to modify the network topology;

(e) calculating a network cost for operating the modified network topology;

(f) calculating a standard deviation of link utilization for the modified network topology;

(g) restoring the weight and marking said one of said each link having the maximum link cost when at least one of:

the network cost for operating the modified network topology is greater than or equal to the network cost for operating the current network topology; and the standard deviation of link utilization for the current topology is less than the standard deviation of link utilization for the modified topology; and (h) repeating steps (d) through (g) until said each link in the network topology is marked.

21. A method for increasing the capability of a network topology model as defined in claim 20, wherein:
step (c) further comprises determining survivability characteristics of the current network topology;
step (e) further comprises determining the survivability characteristics of the modified network topology; and
step (g) for restoring the weight and marking the link having the maximum link cost is performed when at least one of:
the survivability characteristics of the modified network has deteriorated in comparison to the survivability characteristics of the current network topology;
the network cost for operating the modified network topology is greater than or equal to the network cost for operating the current network topology; and
the standard deviation of link utilization for the current topology is less than the standard deviation of link utilization for the modified topology.

22. A method of adjusting link weights in a network topology model having a plurality of nodes connected by links to reduce the cost of network operation without increasing an imbalance in link utilizations, said method comprising the steps of:
(a) calculating a standard deviation of link utilization for the current network topology;
(b) unmarking each link in the network topology;
(c) calculating a network cost for operating the current network topology based upon a link cost associated with said each link;
(d) incrementing the weight of the unmarked link in the current network topology having the maximum cost to modify the network topology;
(e) calculating a network cost for operating the modified network topology;
(f) calculating a standard deviation of link utilization for the modified network topology;
(g) restoring the weight and marking said one of said each link having the maximum link cost when at least one of:
the network cost for operating the modified network topology is greater than or equal to the network cost for operating the current network topology; and
the standard deviation of link utilization for the current network topology is less than the standard deviation of link utilization for the modified network topology; and
(h) repeating steps (c) through (g) until said each link in the network topology is marked.

23. A method for increasing the capability of a network topology model as defined in claim 22, wherein:
step (c) further comprises determining survivability characteristics of the current network topology;
step (e) further comprises determining the survivability characteristics of the modified network topology; and
step (g) for restoring the weight and marking the link having the maximum link cost is performed when at least one of:
the survivability characteristics of the modified network has deteriorated in comparison to the survivability characteristics of the current network topology;
the network cost for operating the modified network topology is greater than or equal to the network cost for operating the current network topology; and
the standard deviation of link utilization for the current network topology is less than the standard deviation of link utilization for the modified network topology.

24. A method of adjusting link weights as defined in claim 22, further comprising the step of:
(i) increasing the link capacity such that the link utilization is no longer higher than a specified threshold.

25. A computer-readable storage medium comprising instructions for increasing the capability of a network topology model having a plurality of nodes connected by existing links to maintain service continuity in the presence of faults that, when executed by a processor, causes the processor to:
(a) add new links to the network topology model to protect against single node failures; and
(b) adjust link weights for the network topology model to reduce at least one of a cost of network operation, and an imbalance in link utilizations;
wherein step (a) comprises the sub-steps of:
(1) failing one of the plurality of nodes in the network topology;
(2) calculating a first number of disconnected node pairs;
(3) selecting a pair of nodes which are neighbors to the failed node;
(4) adding a new link between the pair of nodes;
(5) calculating a second number of disconnected node pairs;
(6) retaining the new link and setting the first number equal to the second number when the second number is less than the first number;
(7) repeating sub-steps (3) through (6) for randomly selected combinations of pairs of neighbor nodes until the first number equals zero;
(8) repeating sub-steps (1) through (7) for each of the plurality of nodes in the network topology as modified by the addition of the retained links;
(9) removing one of the plurality of retained links in the modified network topology;
(10) restoring the removed link when the removal causes any node pair to become disconnected for any single node failure; and
(11) repeating sub-steps (9) through (11) for each of the plurality of retained new links in the modified network topology.

26. A computer-readable storage medium as defined in claim 25, wherein the medium further comprises instructions, that when executed by the processor, causes the processor to reduce said imbalance in link utilizations without deteriorating said cost of network operation.

27. A computer-readable storage medium as defined in claim 25, wherein the medium further comprises instructions, that when executed by the processor, causes the processor to reduce said cost of network operation without increasing said imbalance in link utilizations.

28. A computer-readable storage medium as defined in claim 25, wherein the medium further comprises instructions, that when executed by the processor, causes the processor to reduce said cost of network operation without increasing said imbalance in link utilizations while keeping the utilization for each link below a specific threshold.

29. A computer-readable storage medium as defined in claim 25, wherein the medium further comprises instructions, that when executed by the processor, causes the processor to:
(c) add links to the network topology model to reduce the cost of network operation.

30. An apparatus for increasing the capability of a network topology model having a plurality of nodes connected by existing links to maintain service continuity in the presence of faults, said apparatus comprising:

a network topology analyzing unit configured to:
(a) add new links to the network topology model to protect against single node failures; and
(b) adjust link weights for the network topology model to reduce at least one of a cost of network operation, and an imbalance in link utilizations;

wherein step (a) comprises the sub-steps of:
(1) failing one of the plurality of nodes in the network topology;
(2) calculating a first number of disconnected node pairs;
(3) selecting a pair of nodes which are neighbors to the failed node;
(4) adding a new link between the pair of nodes;
(5) calculating a second number of disconnected node pairs;
(6) retaining the new link and setting the first number equal to the second number when the second number is less than the first number;
(7) repeating sub-steps (3) through (6) for randomly selected combinations of pairs of neighbor nodes until the first number equals zero;
(8) repeating sub-steps (1) through (7) for each of the plurality of nodes in the network topology as modified by the addition of the retained links;
(9) removing one of the plurality of retained links in the modified network topology;
(10) restoring the removed link when the removal causes any node pair to become disconnected for any single node failure; and
(11) repeating sub-steps (9) through (11) for each of the plurality of retained new links in the modified network topology.

* * * * *